United States Patent
Ito

(10) Patent No.: US 9,774,483 B2
(45) Date of Patent: Sep. 26, 2017

(54) COMMUNICATION APPARATUS, COMMUNICATION SYSTEM, COMMUNICATION METHOD, AND TERMINAL APPARATUS

(75) Inventor: Akira Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 802 days.

(21) Appl. No.: 13/323,374

(22) Filed: Dec. 12, 2011

(65) Prior Publication Data

US 2012/0082137 A1 Apr. 5, 2012

Related U.S. Application Data

(63) Continuation of application No. PCT/JP2009/061034, filed on Jun. 17, 2009.

(51) Int. Cl.
 *H04L 27/26* (2006.01)
 *H04W 72/04* (2009.01)
 *H04W 76/04* (2009.01)

(52) U.S. Cl.
 CPC ....... *H04L 27/2647* (2013.01); *H04W 72/042* (2013.01); *H04W 76/04* (2013.01); *H04W 76/048* (2013.01)

(58) Field of Classification Search
 None
 See application file for complete search history.

(56) References Cited

U.S. PATENT DOCUMENTS

| | | | |
|---|---|---|---|
| 6,535,739 B1 | 3/2003 | Chen et al. | |
| 6,771,618 B1 | 8/2004 | Ueda | |
| 7,280,833 B2 | 10/2007 | Suda et al. | |
| 7,734,859 B2 * | 6/2010 | Daniel | H04L 67/1097 370/466 |
| 8,457,151 B2 * | 6/2013 | Yamada | H04W 72/048 370/310 |
| 2002/0131426 A1 * | 9/2002 | Amit | H04L 12/2801 370/401 |
| 2004/0067774 A1 * | 4/2004 | Masaoka et al. | 455/561 |

(Continued)

FOREIGN PATENT DOCUMENTS

| | | |
|---|---|---|
| CN | 1435069 | 8/2003 |
| CN | 101047951 A | 10/2007 |

(Continued)

OTHER PUBLICATIONS

Notice of Preliminary Rejection issued for corresponding Korean Patent Application No. 10-2011-7029976 with English translation, mailed May 7, 2013.
International Search Report with written Opinion for corresponding International Patent Application No. PCT/JP2009/061034, mailed Sep. 29, 2009; English translation attached.

(Continued)

*Primary Examiner* — Chirag Shah
*Assistant Examiner* — Joshua Smith
(74) *Attorney, Agent, or Firm* — Myers Wolin, LLC

(57) ABSTRACT

A communication apparatus includes a receiver that can receive data that has been divided among multiple communication carriers and transmitted, and that has multiple communication modes, each using a different number of communication carriers for reception; an acquirer that acquires information indicating a change in the communication volume of the receiver; and a switch that switches the communication mode of the receiver, based on the information acquired by the acquirer.

7 Claims, 27 Drawing Sheets

(56) References Cited

U.S. PATENT DOCUMENTS

| | | | | |
|---|---|---|---|---|
| 2006/0116123 | A1* | 6/2006 | Purnadi | H04L 5/023 455/435.1 |
| 2006/0221894 | A1* | 10/2006 | Casaccia et al. | 370/328 |
| 2007/0097920 | A1* | 5/2007 | Chen et al. | 370/329 |
| 2007/0109989 | A1* | 5/2007 | Nakagawa et al. | 370/328 |
| 2008/0063100 | A1 | 3/2008 | McFarland | |
| 2009/0086662 | A1* | 4/2009 | Okada | 370/311 |
| 2009/0092091 | A1* | 4/2009 | Balasubramanian | H04L 5/0064 370/329 |
| 2009/0147748 | A1* | 6/2009 | Ofuji et al. | 370/330 |
| 2009/0245178 | A1* | 10/2009 | Gholmieh | H04L 1/0001 370/328 |
| 2010/0034152 | A1* | 2/2010 | Imamura | 370/329 |
| 2010/0190506 | A1* | 7/2010 | To | H04L 5/0007 455/452.1 |
| 2010/0195551 | A1* | 8/2010 | Kuwana | 370/311 |
| 2010/0240400 | A1* | 9/2010 | Choi | H04W 68/02 455/458 |

FOREIGN PATENT DOCUMENTS

| | | |
|---|---|---|
| CN | 101185260 | 5/2008 |
| CN | 101287288 | 10/2008 |
| JP | 2000-174770 | 6/2000 |
| JP | 2001-024706 | 1/2001 |
| JP | 2003-530796 | 10/2003 |
| JP | 2008-244771 | 10/2008 |
| KR | 10-2004-0050882 | 6/2004 |
| WO | 01/78440 | 10/2001 |
| WO | 0178440 | 10/2001 |

OTHER PUBLICATIONS

Japanese International Preliminary Report on Patentability with written Opinion of the International Searching Authority issued for corresponding International Patent Application No. PCT/JP2009/061034 with filing date of Jun. 17, 2009 and mailing date of Jan. 26, 2012. English Translation included.

Notice of Rejection issued for corresponding Japanese Patent Application No. 2011-519352 mailed Jan. 8, 2013 with partial English translation.

NTT Docomo; "Initial Access Procedure for Asymmetric Wider Bandwidth in LTE-Advanced"; Agenda Item: 15.4; Meeting #57; R1-092099 (original R1-083680); May 4-8, 2009; 3GPP TSG RAN WG1; San Francisco, United States of America.

Kamiya; "Observation deck of mobile techniques" with partial English translation; Telecommunication; May 25, 2009; vol. 26, No. 6, p. 70; Kabushiki Kaisha RIC Telecom.

Rejection Decision issued for corresponding Japanese Patent Application No. 2011-519352, mailed Apr. 16, 2013, with partial English translation.

First Notification of Office Action issued by State Intellectual Property Office of China, for corresponding Chinese Patent Application 200980159919.2 dated Aug. 4, 2014. English Translation of the Office Action.

Second Notification of Office Action issued for corresponding Chinese Patent Application No. 200980159919.2, dated Apr. 3, 2015, with an English translation.

Extended European search report with supplementary European search report and the European search opinion issued by the European Patent Office for corresponding European Patent Application No. 09846166.8, dated Mar. 14, 2017.

* cited by examiner

COMMUNICATION APPARATUS, COMMUNICATION SYSTEM, COMMUNICATION METHOD, AND TERMINAL APPARATUS

CROSS REFERENCE TO THE RELATED APPLICATIONS

This application is a continuation application of International Application PCT/JP2009/061034, filed Jun. 17, 2009, now pending, the entire contents of which are wholly incorporated herein by reference.

FIELD

The embodiments discussed herein are related to a communication apparatus, a communication system, and a communication method that perform communication.

BACKGROUND

Under the 3rd Generation Partnership Project (3GPP), a collaboration of organizations for setting industrial standards, the establishment of Long Term Evolution (LTE)-Advanced specifications is underway. Under LTE-Advanced, an LTE system carrier (e.g., of a maximum of 20 MHz) is defined as a component carrier and the aggregation of component carriers to obtain high throughput is being investigated.

To provide a wireless data communication method and apparatus that can guarantee communication at an optimal communication speed under any line state, a wireless data communication method of a wireless data communication apparatus that wirelessly communicates data using multiple lines by a multi-ring method, has a stabilizing unit that monitors the line state, and based on the obtained monitoring information, switches data paths and performs line selection, has been disclosed (see, for example, Japanese Laid-Open Patent Publication No. 2000-174770).

A packet transferring method has been disclosed in which a wired line connecting a base station apparatus and an exchange station includes a common channel that can be commonly used by multiple terminals and exclusive channels that can be used respectively by only one terminal. When the volume of data transferred from a terminal is a given value or greater, the terminal is allocated an exclusive channel and when data is transferred using the exclusive channel, the data that is to be transferred from the terminal is queued consequent to the excessive volume of transfer data. When the volume of queued data becomes equal to or exceeds a predetermined value at which the data volume causes delay to occur, the terminal is newly allocated an exclusive channel. The exclusive channel and the additional exclusive channel are used to transfer packets until the volume of queued data becomes less than or equal to a predetermined value at which the volume of delayed data recovers (see, for example, Japanese Laid-Open Patent Publication No. 2001-024706).

However, with the conventional technologies above, a problem arises in that physical resources cannot be efficiently used. For example, when there is no data to be transferred, or when there is little data to be transferred, power is wasted using multiple component carriers for transmission and reception.

In particular, at the communication apparatus on the receiving side, when there is no data to be transferred, or when there is little data to be transferred, wasteful power consumption is great since multiple component carriers are received to confirm whether data has been stored. Further, not limited to the component carriers prescribed by LTE-Advanced, on a whole, communication methods that separate data among communication carriers for transmission have a similar problem.

SUMMARY

According to an aspect of an embodiment, a communication apparatus includes a receiver that can receive data that has been divided among multiple communication carriers and transmitted, and that has multiple communication modes, each using a different number of communication carriers for reception; an acquirer that acquires information indicating a change in the communication volume of the receiver; and a switch that switches the communication mode of the receiver, based on the information acquired by the acquirer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
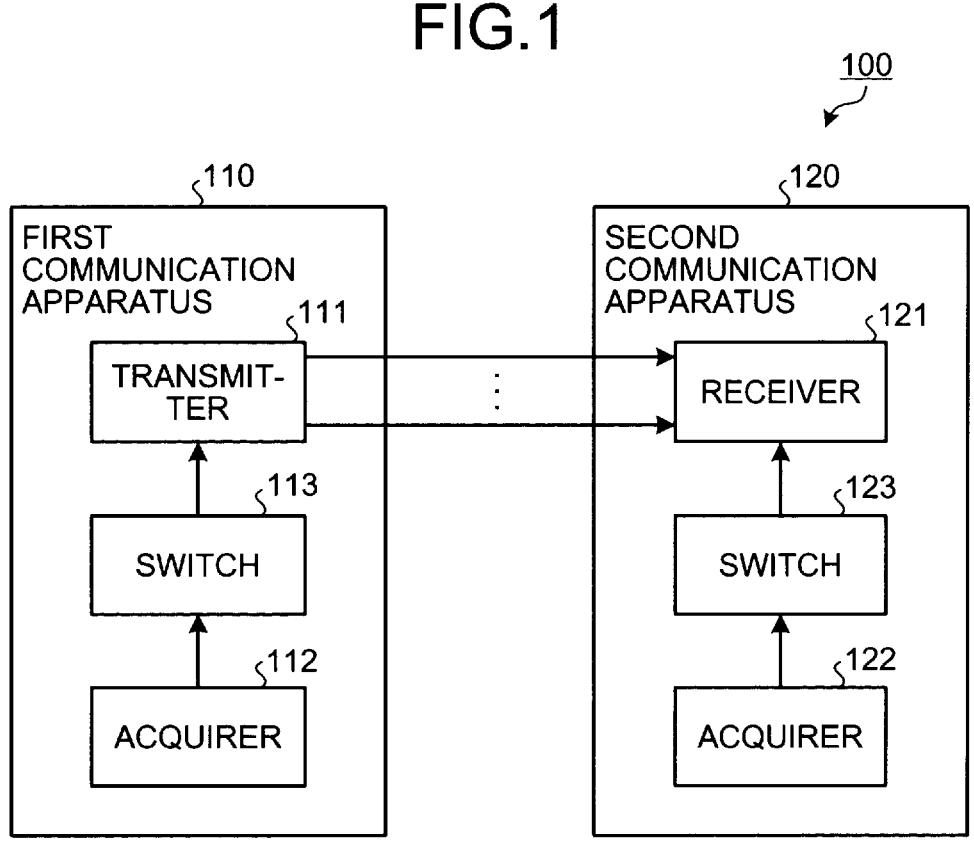
FIG. 1 is a block diagram of configuration of a communication system according to a first embodiment.

FIG. 1 is a block diagram of configuration of a communication system according to a first embodiment. As depicted in FIG. 1, a communication system 100 according to a first embodiment includes a first communication apparatus 110 and a second communication apparatus 120. In this example, configurations of the first communication apparatus 110 and the second communication apparatus 120 will be described for transmitting data from the first communication apparatus 110 to the second communication apparatus 120. Nonetheless, the first communication apparatus 110 and the second communication apparatus 120 may be configured to transmit data from the second communication apparatus 120 to the first communication apparatus 110.

The first communication apparatus 110 includes a transmitter 111, an acquirer 112, and a switch 113. The transmitter 111 can divide data among multiple communication carriers and transmit the data, and has multiple communication modes, each using a different number of communication carriers for transmission. For example, the transmitter 111 has a multi-carrier mode and a single carrier mode, as communication modes.

The multi-carrier mode is a communication mode in which multiple transmitting communication carriers are used. When in the multi-carrier mode, the transmitter 111 divides data among multiple communication carriers and transmits the data. The single carrier mode is a communication mode in which a single transmitting communication carrier is used. When in the single carrier mode, the transmitter 111 transmits data by a single carrier.

The acquirer 112 acquires information indicating a change in the communication state of the transmitter 111. A change in the communication state of the transmitter 111, for example, is a change in the volume of data transmitted by the transmitter 111. A change in the communication state of the transmitter 111 may be a change in whether the transmitter 111 has data to transmit. The acquirer 112 outputs the acquired information to the switch 113.

The switch 113 switches the communication mode of the transmitter 111, based on the information acquired by the acquirer 112. For example, if the information output from the acquirer 112 indicates that the volume of data transmitted by the transmitter 111 exceeds a given volume, the switch 113 switches the communication mode of the transmitter 111 to the multi-carrier mode. Further, if the information output from the acquirer 112 indicates that the volume of data transmitted by the transmitter 111 is less than or equal to the given volume, the switch 113 switches the communication mode of the transmitter 111 to the single carrier mode.

Configuration may be such that if the information output from the acquirer 112 indicates that there is data to be transmitted by the transmitter 111, the switch 113 switches the communication mode of the transmitter 111 to the multi-carrier mode. Further, configuration may be such that if the information output from the acquirer 112 indicates that there is no data to be transmitted by the transmitter 111, the switch 113 switches the communication mode of the transmitter 111 to the single carrier mode.

The second communication apparatus 120 includes a receiver 121, an acquirer 122, and a switch 123. The receiver 121 can receive data that has been divided among multiple communication carriers and transmitted, and has multiple communication modes, each using a different number of communication carriers for reception. For example, the receiver 121 has a multi-carrier mode and a single carrier mode as communication modes.

The multi-carrier mode is a communication mode in which multiple receiving communication carriers are used. When in the multi-carrier mode, the receiver 121 receives data that has been divided among multiple communication carriers and transmitted. The single carrier mode is a communication mode in which a single receiving communication carrier is used. When in the signal carrier mode, the receiver 121 receives data by a single carrier.

The acquirer 122 acquires information indicating a change in the communication state of the receiver 121. A change in the communication state of the receiver 121, for example, is a change in the volume of data received by the receiver 121. A change in the communication state of the receiver 121 may be a change in whether there is data to be received by the receiver 121. The acquirer 122 outputs the acquired information to the switch 123.

The switch 123 switches the communication mode of the receiver 121, based on the information acquired by the acquirer 122. For example, if the information output from the acquirer 122 indicates that the volume of data received by receiver 121 exceeds a given volume, the switch 123 switches the communication mode of the receiver 121 to the multi-carrier mode. If the information output from the acquirer 122 indicates that the volume of data received by the receiver 121 is less than or equal to the given volume, the switch 123 switches the communication mode of the receiver 121 to the single carrier mode.

Configuration may be such that if the information output from the acquirer 122 indicates that there is data to be received by the receiver 121, the switch 123 switches the communication mode of the receiver 121 to the multi-carrier mode. In this case, if the information output from the acquirer 122 indicates that there is no data to be received by the receiver 121, the switch 123 switches the communication mode of the receiver 121 to the single carrier mode.

The transmitter 111 of the first communication apparatus 110 is implemented by, for example, a wireless communication interface such as an antenna and communication control circuit. The acquirer 112 of the first communication apparatus 110 is implemented by, for example, an information processor such as a digital signal processor (DSP). The acquirer 112 stores the acquired information to a memory of the first communication apparatus 110. The switch 113 of the first communication apparatus 110 is implemented by, for example, an information processor such as a DSP. The switch 113 reads out the information stored to the memory by the acquirer 112 and based on the read information, switches the communication mode.

The receiver 121 of the second communication apparatus 120 is implemented by, for example, a wireless communication interface such as an antenna and communication control circuit. The acquirer 122 of the second communication apparatus 120 is implemented by, for example an information processor such as a DSP. The acquirer 122 stores the acquired information to a memory of the second communication apparatus 120. The switch 123 of the second communication apparatus 120 is implemented by, for example, an information processor such as a DSP. The switch 123 reads out the information stored to the memory by the acquirer 122 and based on the read information, switches the communication mode.

Figure 2:
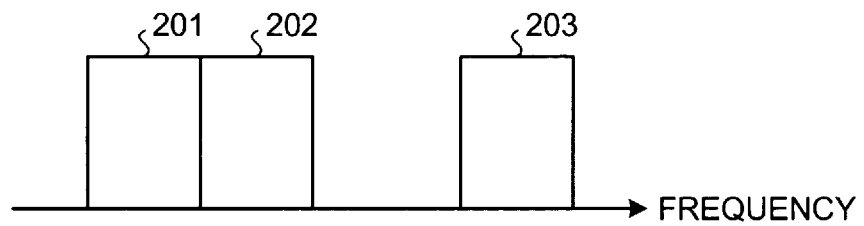
FIG. 2 is a diagram of communication carriers used in the communication system.

FIG. 2 is a diagram of communication carriers used in the communication system. In FIG. 2, the horizontal axis represents frequency. Communication carriers 201 to 203 each represent system carriers divided by frequency. When in the multi-carrier mode, the transmitter 111 of the first communication apparatus 110, for example, divides data among the communication carriers 201 to 203 and transmits the data. Further, when in the single carrier mode, the transmitter 111 of the first communication apparatus 110 transmits data by the communication carrier 201.

When in the multi-carrier mode, the receiver 121 of the second communication apparatus 120, for example, receives data that has been divided among the communication carriers 201 to 203 and transmitted. Further, when the transmitter 111 of the first communication apparatus 110 is in the single carrier mode, for example, the receiver 121 receives data transmitted by the communication carrier 201.

In this manner, according to communication state, the communication system 100 of the first embodiment switches between communication modes of differing component carrier counts. Consequently, when the volume of data to be transmitted is great, a communication mode of a large number of component carriers (e.g., the multi-carrier mode) is switched to, whereby communication of high throughput can be performed.

Further, when there is little or no data to be transmitted, a communication mode of a small number of component carriers (e.g., the single carrier mode) is switched to, whereby power consumption of the first communication apparatus 110 and the second communication apparatus 120 can be suppressed. In this manner, according to the communication system 100, communication resources can be used efficiently.

Figure 3:
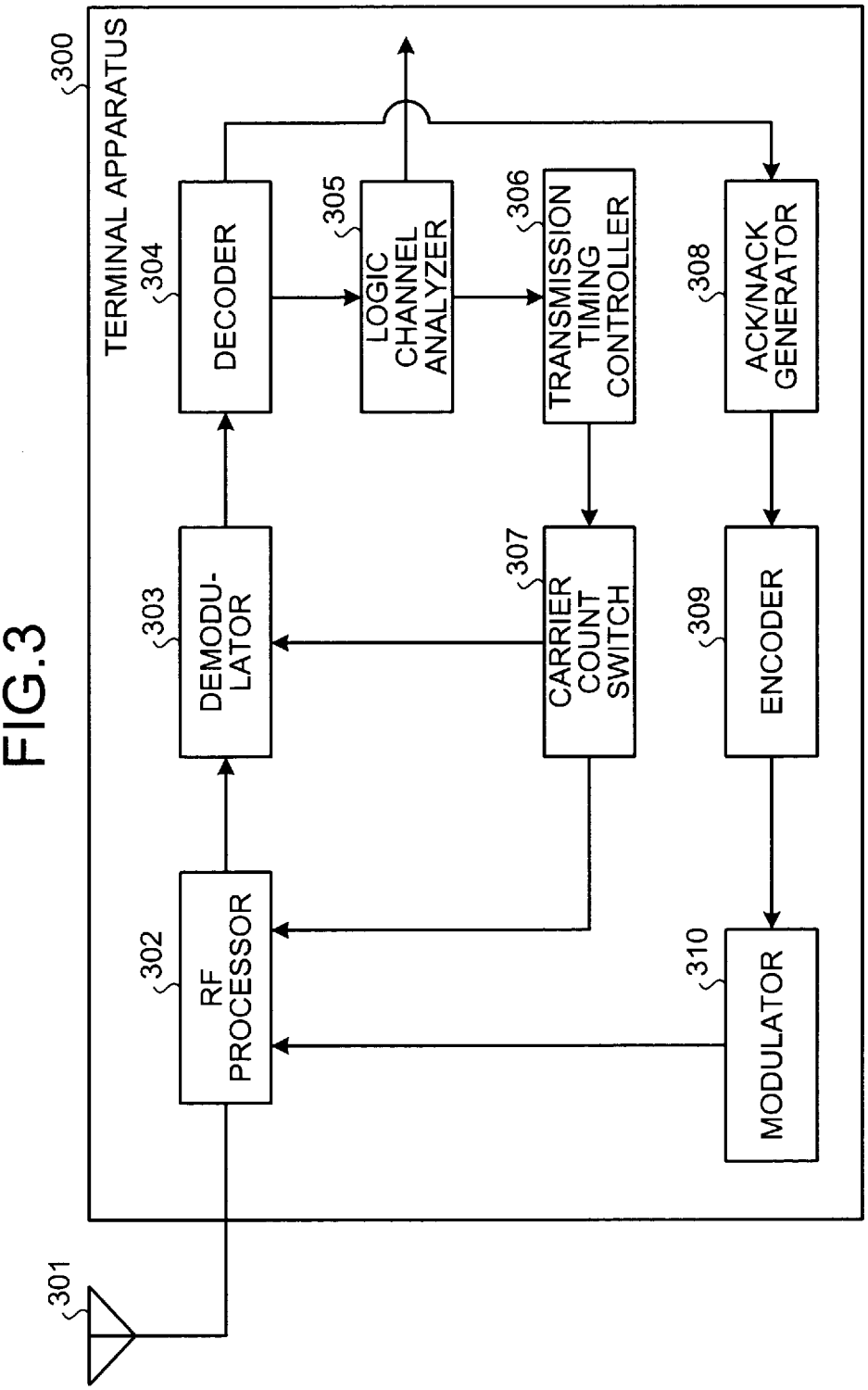
FIG. 3 is a block diagram of a configuration of a terminal apparatus according to a second embodiment.

FIG. 3 is a block diagram of a configuration of a terminal apparatus according to a second embodiment. As depicted in FIG. 3, a terminal apparatus 300 according to the second embodiment includes an antenna 301, an RF processor 302, a demodulator 303, a decoder 304, a logic channel analyzer 305, a transmission timing controller 306, a carrier count switch 307, an ACK/NACK generator 308, an encoder 309, and a modulator 310.

The terminal apparatus 300 corresponds to, for example, the second communication apparatus 120 depicted in FIG. 1. Further, the terminal apparatus 300, for example, is a terminal apparatus that is compliant with LTE-Advanced. The terminal apparatus 300 can receive data that has been divided among multiple component carriers (communication carriers) and transmitted, and has multiple communication modes, each using a different number of communication carriers. For example, as communication modes, the terminal apparatus 300 has the multi-carrier mode in which multiple receiving communication carriers are used and the single carrier mode in which a single receiving communication carrier is used.

The antenna 301, the RF processor 302, the demodulator 303, and the decoder 304, for example, correspond to the receiver 121 depicted in FIG. 1. The logic channel analyzer 305, for example, corresponds to the acquirer 122 depicted in FIG. 1. The carrier count switch 307, for example, corresponds to the switch 123 depicted in FIG. 1.

Figure 4:
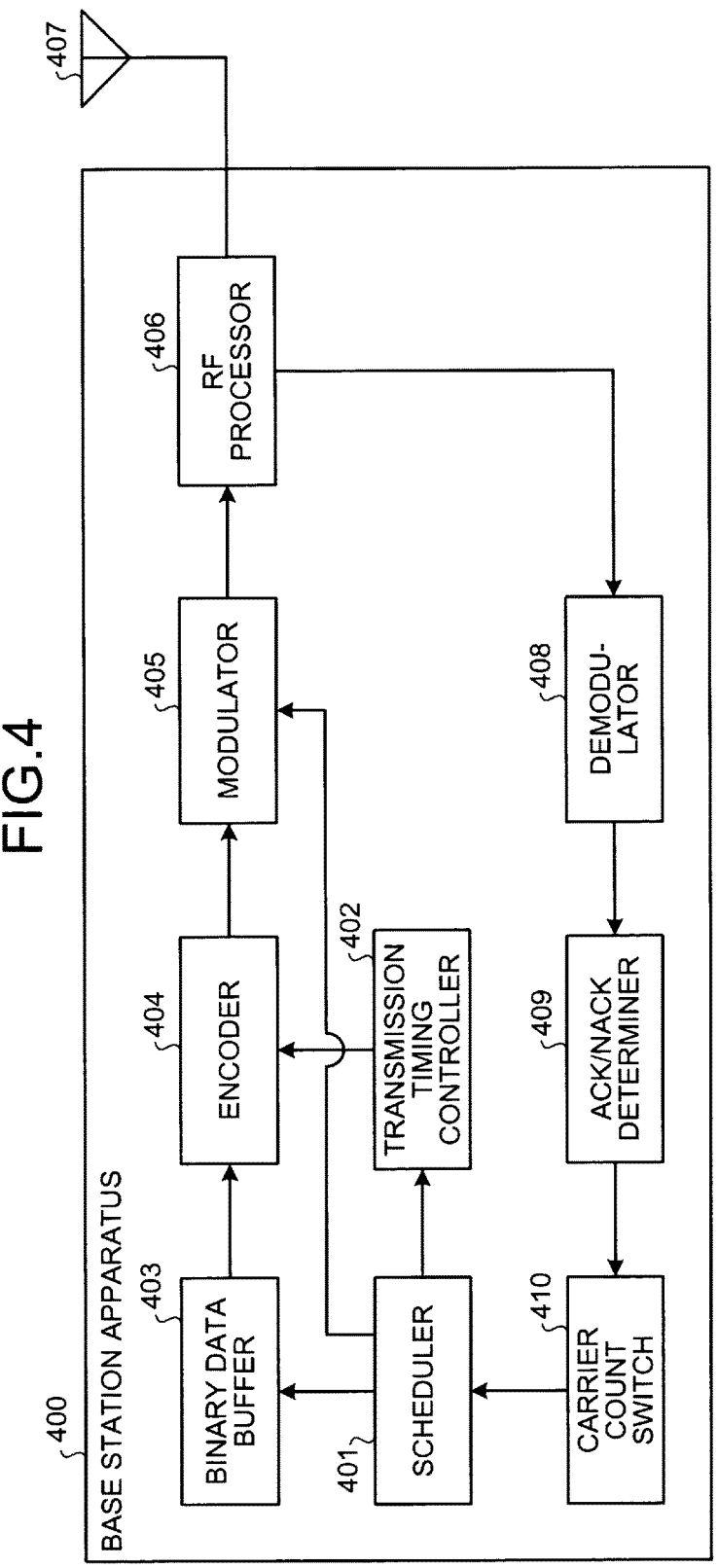
FIG. 4 is a block diagram of a configuration of a base station apparatus according to the second embodiment.

The antenna 301 is an antenna for performing wireless communication with a base station apparatus (e.g., a base station apparatus 400 depicted in FIG. 4). For example, the antenna 301 receives a signal transmitted by the base station apparatus and outputs the signal to the RF processor 302. The antenna 301 further transmits to the base station apparatus, a delivery confirmation signal (ACK or NACK) output from the RF processor 302.

The RF processor 302 converts the frequency of the signal output from the antenna 301, from a high frequency wave (radio frequency (RF)) to a baseband, and outputs the frequency converted signal to the demodulator 303. The RF processor 302 further converts the frequency of the delivery confirmation signal output from the modulator 310, from a baseband to a high frequency wave, and outputs the frequency converted delivery confirmation signal to the antenna 301.

The demodulator 303 demodulates the signal output from the RF processor 302 and outputs the demodulated signal to the decoder 304. The decoder 304 decodes the signal output from the demodulator 303 and outputs the data resulting from the decoding, to the logic channel analyzer 305. For example, the decoder 304 performs signal error correction and decoding (forward error correction (FEC)) and notifies the ACK/NACK generator 308 of the results.

The logic channel analyzer 305 performs logic channel analysis on the data output from the decoder 304. For example, the logic channel analyzer 305 acquires binary data included in the data and outputs the acquired binary data downstream. Binary data is, for example, user data transmitted by the base station apparatus. The logic channel analyzer 305 further acquires, as information indicating changes in communication state, a timing command included in the data.

For example, from the area storing the logic channel ID of the data, the logic channel analyzer 305 detects an ID representing a timing command and acquires the timing command from the area corresponding to the detected ID. A timing command is a command indicating the timing at which the terminal apparatus 300 is to transmit the data to the base station apparatus.

For example, a timing command is indicated by a difference from the previous transmission timing of the terminal apparatus 300. A valid period is set for the timing command. The length of the valid period, for example, is set by the base station apparatus when the terminal apparatus 300 first connects to the base station apparatus. The logic channel analyzer 305 outputs the acquired timing command to the transmission timing controller 306.

The transmission timing controller 306, based on the timing command output from the logic channel analyzer 305, controls the transmission timing of data (user data) transmitted by the terminal apparatus 300. However, in FIG. 3, configuration for transmitting data from the terminal apparatus 300 is omitted. The transmission timing controller 306 notifies the carrier count switch 307 of the acquisition of the timing command.

The carrier count switch 307 has a function of a synchronous timer that times the valid period of the timing command. Upon being notified, by the transmission timing controller 306, of the acquisition of the timing command, the carrier count switch 307 starts timing the valid period by the synchronous timer. The carrier count switch 307, based on the valid period of the timing command timed by the synchronous timer, switches the communication mode of the terminal apparatus 300.

For example, the carrier count switch 307 sets the communication mode to the multi-carrier mode during the valid period of the timing command. Outside the valid period of the timing command, the carrier count switch 307 sets the communication mode to the single carrier mode.

For example, the carrier count switch 307 sets the communication mode to the multi-carrier mode by setting the RF processor 302 and the demodulator 303 to perform reception operations by multiple component carriers. The carrier count switch 307 further sets the communication mode to the single carrier mode by setting the RF processor 302 and the demodulator 303 to perform reception operations by a single component carrier.

The ACK/NACK generator 308 generates a delivery confirmation signal, based on the error correction and decoding results from the decoder 304. For example, the ACK/NACK generator 308 generates an ACK signal when the decoder 304 reports no errors or successful correction of errors and generates a NACK signal when the decoder 304 reports failure to correct errors. The ACK/NACK generator 308 outputs the generated delivery confirmation signal to the encoder 309.

The encoder 309 encodes the delivery confirmation signal output from the ACK/NACK generator 308. The encoder 309 outputs the encoded delivery confirmation signal to the modulator 310. The modulator 310 modulates the delivery confirmation signal output from the encoder 309 and outputs the modulated delivery confirmation signal to the RF processor 302.

FIG. 4 is a block diagram of a configuration of the base station apparatus according to the second embodiment. As depicted in FIG. 4, the base station apparatus 400 according to the second embodiment includes a scheduler 401, a transmission timing controller 402, a binary data buffer 403, an encoder 404, a modulator 405, an RF processor 406, an antenna 407, a demodulator 408, an ACK/NACK determiner 409, and a carrier count switch 410.

The base station apparatus 400, for example, corresponds to the first communication apparatus 110 depicted in FIG. 1. The base station apparatus 400 is, for example, a base station apparatus that is compliant with LTE-Advanced. The base station apparatus 400 can divide data among multiple component carriers (communication carriers) and transmit the data, and has multiple communication modes, each using a different number of communication carriers for transmission. For example, as communication modes, the base station apparatus 400 has the multi-carrier mode in which multiple transmitting communication carriers are used and the single carrier mode in which a single transmitting communication carrier is used.

The scheduler 401, the transmission timing controller 402, the encoder 404, the modulator 405, the RF processor 406, and the antenna 407 correspond to, for example, the transmitter 111 depicted in FIG. 1. The demodulator 408 and the ACK/NACK determiner 409 correspond to, for example, the acquirer 112 depicted in FIG. 1. The carrier count switch 410 corresponds to, for example, the switch 113 depicted in FIG. 1.

The scheduler 401 schedules communication between the terminal apparatus 300 and the base station apparatus 400. For example, the scheduler 401 determines the bit count of the data transmitted by the base station apparatus 400 to each terminal apparatus. The scheduler 401, based on the communication mode of the base station apparatus 400 set by the carrier count switch 410, further determines the component carrier to be used for each communication.

For example, when the multi-carrier mode is set by the carrier count switch 410, the scheduler 401 performs scheduling such that multiple component carriers are used to transmit data. Further, when the single carrier mode is set by the carrier count switch 410, the scheduler 401 performs scheduling such that a single component carrier is used to transmit data.

The scheduler 401 notifies the transmission timing controller 402 and the modulator 405 of the scheduling results. The scheduler 401, based on the scheduling results, further outputs to the binary data buffer 403, an instruction to output data. The binary data buffer 403 stores therein data (binary data) for transmissions to the terminal apparatus 300. Upon output of an output instruction from the scheduler 401, the binary data buffer 403 outputs the stored data to the encoder 404.

The transmission timing controller 402, based on the scheduling results from the scheduler 401, generates a timing command that indicates the timing at which the terminal apparatus 300 is to transmit a delivery confirmation signal in response to the data transmitted by the base station apparatus 400. The transmission timing controller 402 outputs the generated timing command to the encoder 404.

The encoder 404 stores the timing command output from the transmission timing controller 402 to the data output from the binary data buffer 403. The encoder 404 encodes the data to which the timing command has been stored and outputs the encoded data to the modulator 405. The modulator 405 modulates the data output from the encoder 404 and outputs to the RF processor 406, the signal obtained by the encoding.

The modulator 405 modulates the data by communication resources (physical resources) corresponding to the component carriers indicated by the scheduling results from the scheduler 401. For example, upon notification that data is to be divided among multiple component carriers and transmitted, the modulator 405 performs data modulation by communication resources corresponding the component carriers. Upon receiving notification that data is to be transmitted by a single component carrier, the modulator 405, performs data modulation by the communication resource corresponding to the component carrier.

The RF processor 406 converts the frequency of the signal output from the modulator 405, from a baseband to a high frequency wave, and outputs the frequency converted signal to the antenna 407. The RF processor 406 further converts the frequency of a delivery confirmation signal output from the antenna 407, from a high frequency wave to a baseband, and outputs the frequency converted delivery confirmation signal to the demodulator 408.

The antenna 407 is an antenna for performing wireless communication with the terminal apparatus 300. For example, the antenna 407 receives a delivery confirmation signal transmitted by the terminal apparatus 300 and outputs the received delivery confirmation signal to the RF processor 406. The antenna 407 further transmits to the terminal apparatus 300, the signal output from the RF processor 406.

The demodulator 408 demodulates the delivery confirmation signal output from the RF processor 406 and outputs the demodulated delivery confirmation signal to the ACK/NACK determiner 409. The ACK/NACK determiner 409 judges the delivery confirmation signal output from the demodulator 408. For example, the ACK/NACK determiner 409 determines whether the delivery confirmation signal is in response to any one of the signals, and determines whether the delivery confirmation signal is any one of an ACK signal and a NACK signal. The ACK/NACK determiner 409 notifies the carrier count switch 410 of the results of determination.

The carrier count switch 410 switches the communication mode of the base station apparatus 400, based on the determination results from the ACK/NACK determiner 409. For example, when the determination results from the ACK/NACK determiner 409 indicate that an ACK signal has been received in response to the timing command, the carrier count switch 410 switches the communication mode to the multi-carrier mode.

The carrier count switch 410 has a synchronous timer function that times the valid period of the timing command transmitted by the base station apparatus 400 to the terminal apparatus 300. Based on the synchronous timer, the carrier count switch 410 switches the communication mode to the single carrier mode, when the time is outside the valid period of the timing command.

For example, the carrier count switch 410 sets the scheduler 401 to perform scheduling for multiple component carriers, and thereby sets the communication mode of the base station apparatus 400 to the multi-carrier mode. The carrier count switch 410 sets the scheduler 401 to perform scheduling for a single component carrier, and thereby sets the communication mode of the base station apparatus 400 to the single carrier mode.

Figure 5:
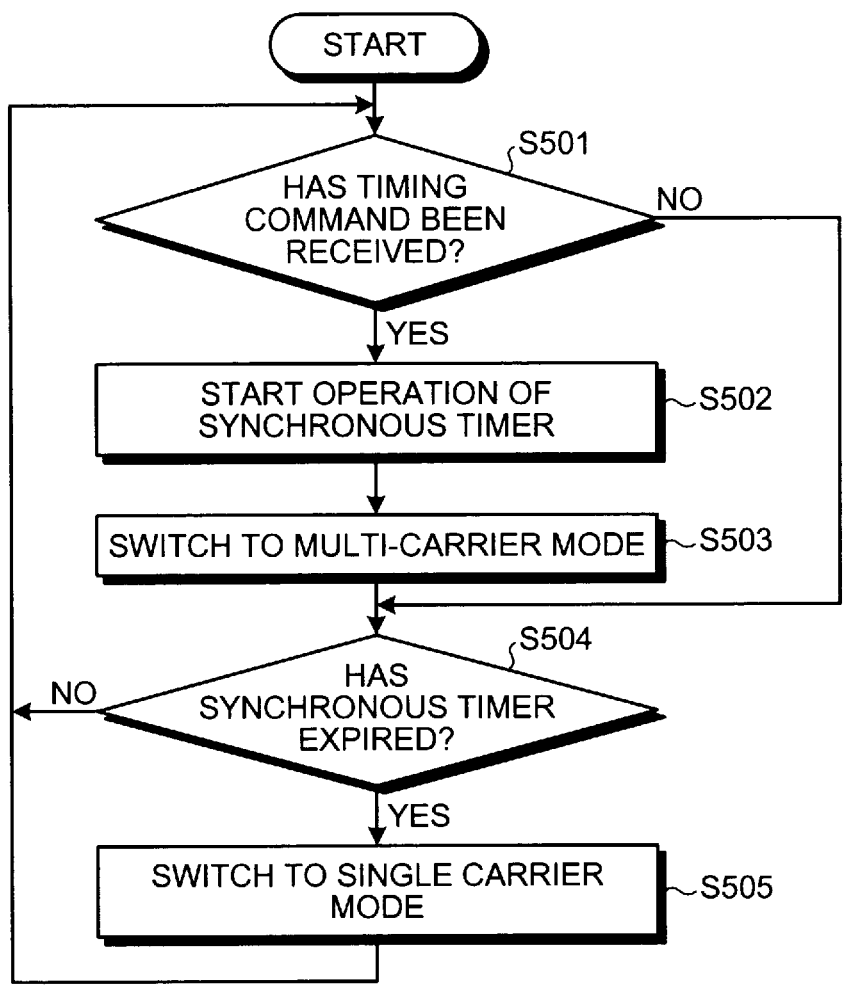
FIG. 5 is a flowchart of an example of operations of a terminal apparatus according to the second embodiment.

FIG. 5 is a flowchart of an example of operations of the terminal apparatus according to the second embodiment. The terminal apparatus 300 (see FIG. 3), for example, performs the following operations. As depicted in FIG. 5, the carrier count switch 307 determines whether a timing command from the base station apparatus 400 has been received (step S501). If a timing command has not been received (step S501: NO), the flow proceeds to step S504.

At step S501, if a timing command has been received (step S501: YES), the carrier count switch 307 starts operation of the synchronous timer that times the valid period of the timing command (step S502). The carrier count switch 307 switches the communication mode of the terminal apparatus 300 to the multi-carrier mode (step S503). The carrier count switch 307 determines whether the synchronous timer started at step S502 has expired (step S504).

At step S504, if the synchronous timer has not expired (step S504: NO), the flow returns to step S501 and processes therefrom are continued. If the synchronous timer has expired (step S504: YES), the carrier count switch 307 switches the communication mode of the terminal apparatus 300 to the single carrier mode (step S505), the flow returns to step S501 and operations therefrom are continued. By performing the above operations, the terminal apparatus 300 can switch the communication mode, based on the valid period of an acquired timing command.

Figure 6:
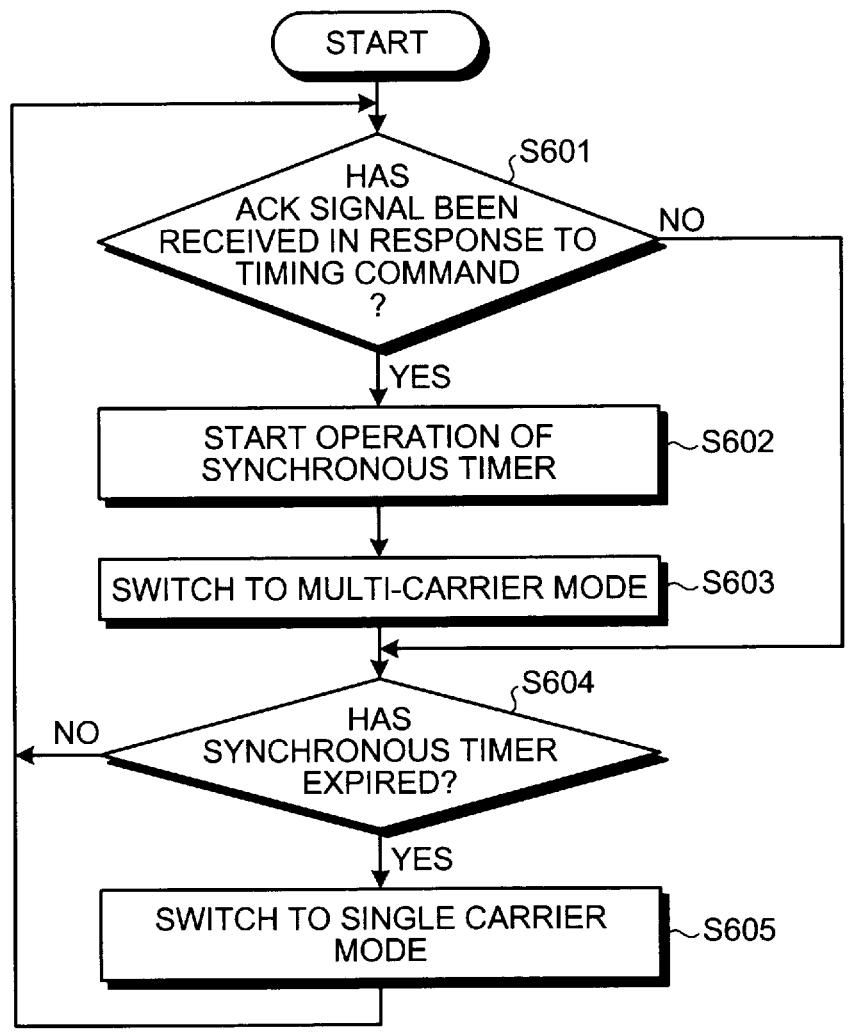
FIG. 6 is a flowchart of an example of operations of the base station apparatus according to the second embodiment.

FIG. 6 is a flowchart of an example of operations of the base station apparatus according to the second embodiment. The base station apparatus 400 (see FIG. 4), for example, performs the following operations. As depicted in FIG. 6, the ACK/NACK determiner 409 determines whether an ACK signal has been received in response to a timing command transmitted to the terminal apparatus 300 (step S601). If an ACK signal has not been received (step S601: NO), the flow proceeds to step S604.

At step S601, if an ACK signal has been received in response to the timing command (step S601: YES), the carrier count switch 410 starts operation of the synchronous timer that times the valid period of the timing command (step S602). The carrier count switch 410 switches the communication mode to the multi-carrier mode (step S603). The carrier count switch 410 determines whether the period of the synchronous timer started at step S602 has expired (step S604).

At step S604, if the timer of the synchronous timer has not expired (step S604: NO), the flow returns to step S601 and processes therefrom are continued. If the period of the synchronous timer has expired (step S604: YES), the carrier count switch 410 switches the communication mode to the single carrier mode (step S605); the flow returns to step S601 and the operations therefrom are continued. By performing the above operations, the base station apparatus 400 can switch the communication mode, based on an acquired delivery confirmation signal that is from the terminal apparatus 300 and in response to the timing command transmitted to the terminal apparatus 300.

Figure 7:
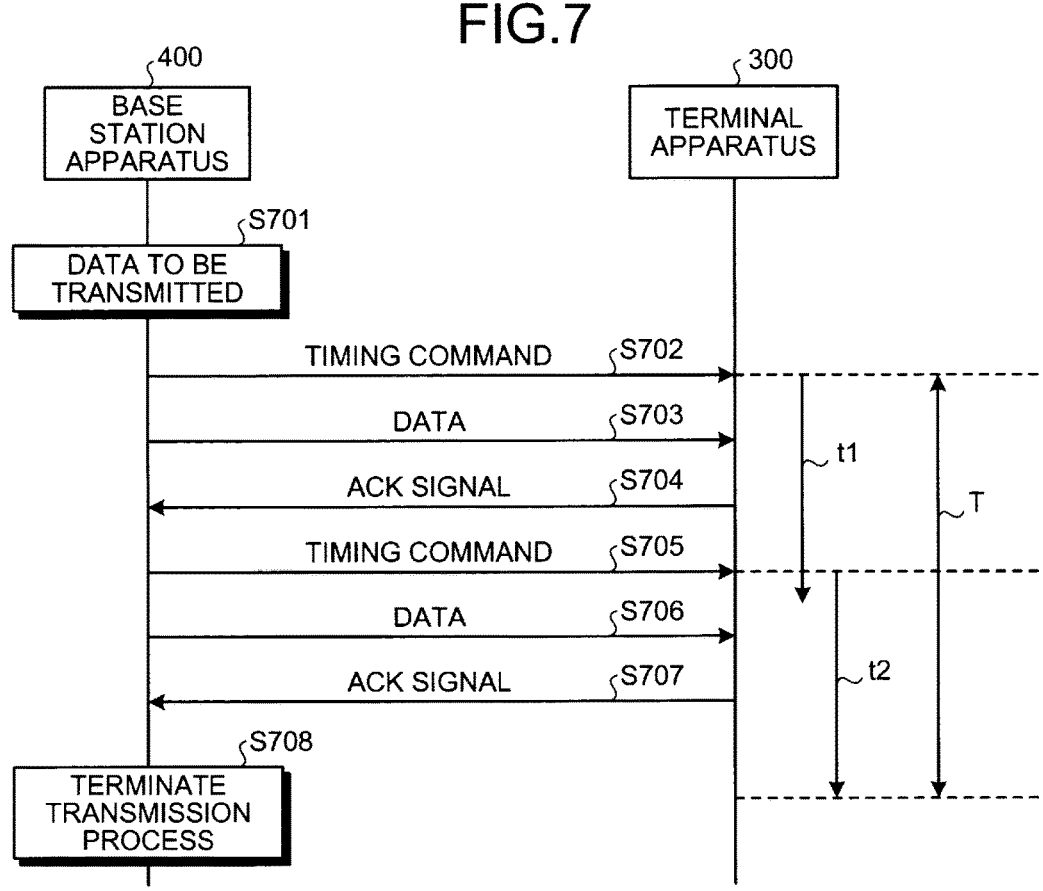
FIG. 7 is a sequence diagram of an example of operations of the communication system according to the second embodiment.

FIG. 7 is a sequence diagram of an example of operations of the communication system according to the second embodiment. When there is transmission data to be transmitted at the base station apparatus 400 (step S701), the base station apparatus 400 transmits a timing command to the terminal apparatus 300 (step S702). Period t1 represents the valid period of the timing command transmitted at step S702. The base station apparatus 400 transmits to the terminal apparatus 300, a portion of the transmission data at step S701 (step S703).

The terminal apparatus 300 transmits an ACK signal to the base station apparatus 400, in response to the data transmitted at step S703 (step S704). The base station apparatus 400 transmits a timing command to the terminal apparatus 300 (step S705). Period t2 represents the valid period of the timing command transmitted at step S705. The base station apparatus 400 transmits to the terminal apparatus 300, a portion of the transmission data at step S701 (step S706).

The terminal apparatus 300 transmits an ACK signal to the base station apparatus 400, in response to the data transmitted at step S706 (step S707). Here, it is assumed that all of the transmission data at step S701 has been received by the terminal apparatus 300 through the steps above. Subsequently, the base station apparatus 400 terminates the transmission process (step S708), ending the series of operations.

During the steps above, the communication modes of the terminal apparatus 300 and the base station apparatus 400 are set as the multi-carrier mode during period T when at least one of the periods t1 and t2 is being timed. Further, during periods outside the period T, the terminal apparatus 300 and the base station apparatus 400 are in the single carrier mode.

In FIG. 7, an example where the data transmitted at step S703 and step S706 is properly received by the terminal apparatus 300 and an ACK signal is transmitted by the terminal apparatus 300 to the base station apparatus 400 has been described. In contrast, when the data is not properly received by the terminal apparatus 300 and a NACK signal is transmitted by the terminal apparatus 300 to the base station apparatus 400, the base station apparatus 400 again transmits the data to the terminal apparatus 300.

Configuration may be such that at the base station apparatus 400, the timing of period t1 begins when an ACK signal (not depicted) that is from the terminal apparatus 300 and in response to the transmitted timing command is received. In this case as well, for example, when data is transmitted at step S703 and step S706, the communication mode of the base station apparatus 400 may be switched to the multi-carrier mode.

As depicted in FIG. 7, the base station apparatus 400 periodically transmits a timing command to the terminal apparatus 300 during the data transmission process, whereby during the data transmission process, the terminal apparatus 300 and the base station apparatus 400 are switched to the multi-carrier mode, enabling communication of high throughput to be performed.

Upon completing the data transmission process, the base station apparatus 400 suspends the transmission of the timing command. Consequently, after the data transmission process, the valid period of the timing command expires and the terminal apparatus 300 and the base station apparatus 400 are switched to the single carrier mode, thereby enabling power consumption of the terminal apparatus 300 and the base station apparatus 400 to be suppressed.

In this manner, the terminal apparatus 300 according to the second embodiment acquires, as information indicating a change in the communication state, a timing command that indicates the timing at which the terminal apparatus 300 is to transmit a signal. The timing command, for example, is a timing command that indicates the timing at which the terminal apparatus 300 is to transmit a delivery confirmation signal in response to data received by the terminal apparatus 300.

The terminal apparatus 300 switches the communication mode, based on the valid period of the acquired timing command. Since an existing timing command can be used as information indicating a change in the communication state, communication resources can be used efficiently without new control information being communicated to/from the base station apparatus 400.

For example, during the valid period of the timing command, the possibility of data being transmitted from the base station apparatus 400 is high and therefore, the terminal apparatus 300 switches to the multi-carrier mode during the valid period of the timing command, enabling communication of high throughput to be performed. Outside the valid period of the timing command, the possibility of data being transmitted from the base station apparatus 400 is low and therefore, the terminal apparatus 300 switches to the single carrier mode during periods outside the valid period of the timing command, thereby enabling power consumption to be suppressed.

Furthermore, since new control information need not be communicated, efficient use of communication resources can be achieved without large design modifications. In addition, pressure on the communication resources consequent to the communication of new control information can be prevented. Delays in the switching of the communication mode consequent to the communication of new control information can also be prevented.

The base station apparatus 400 according to the second embodiment acquires, as information indicating a change in the communication state, a delivery confirmation signal that is from the terminal apparatus 300 and in response to a timing command transmitted to the terminal apparatus 300; and based on the delivery confirmation signal, switches the communication mode. Since an existing timing command can be used as information indicating a change in the communication state, communication resources can be used efficiently without new control information being communicated to/from the terminal apparatus 300.

For example, when a delivery confirmation signal that is in response to a timing command and from the terminal apparatus 300 is acquired, the base station apparatus 400 switches to the multi-carrier mode during the valid period of the timing command and to the single carrier mode outside the valid period of the timing command. Consequently, since the communication mode is switched after confirmation of the timing command being properly received by the terminal apparatus 300, the communication mode of the base station apparatus 400 can be switched in conjunction with the switching of communication modes by the terminal apparatus 300.

For communication in which a delivery confirmation signal is not communicated, the base station apparatus 400 does not transmit to the terminal apparatus 300, a timing command for the transmission of a delivery confirmation signal and therefore, the communication modes of the terminal apparatus 300 and the base station apparatus 400 are the single carrier mode. For communication in which a delivery confirmation signal Is not communicated, the volume of data is often small and thus, in this case, sufficient throughput can be achieve by the single carrier mode and power consumption can be suppressed.

For example, for paging control channels (PCCH) and broadcast control channels (BCCH) under LTE, although a delivery confirmation signal is not communicated, the data rate is low. In the second embodiment, for PCCHs and BCCHs, since the communication mode remains as the single carrier mode, sufficient throughput can be achieved and power consumption can be suppressed.

The timing command may be a timing command that indicates the timing at which the terminal apparatus 300 is to transmit data (user data) to the base station apparatus 400. For example, when there is data to be transmitted to the base station apparatus 400, the terminal apparatus 300 accesses the base station apparatus 400 by random access and acquires from the base station apparatus 400, a timing command for the transmission of data.

In this case as well, the base station apparatus 400 switches the communication mode, based on the acquired valid period of the timing command, thereby enabling efficient use of communication resources. The number of component carriers used in the multi-carrier mode may differ for downlinks from the base station apparatus 400 to the terminal apparatus 300 and uplinks from the terminal apparatus 300 to the base station apparatus 400.

Figure 8:
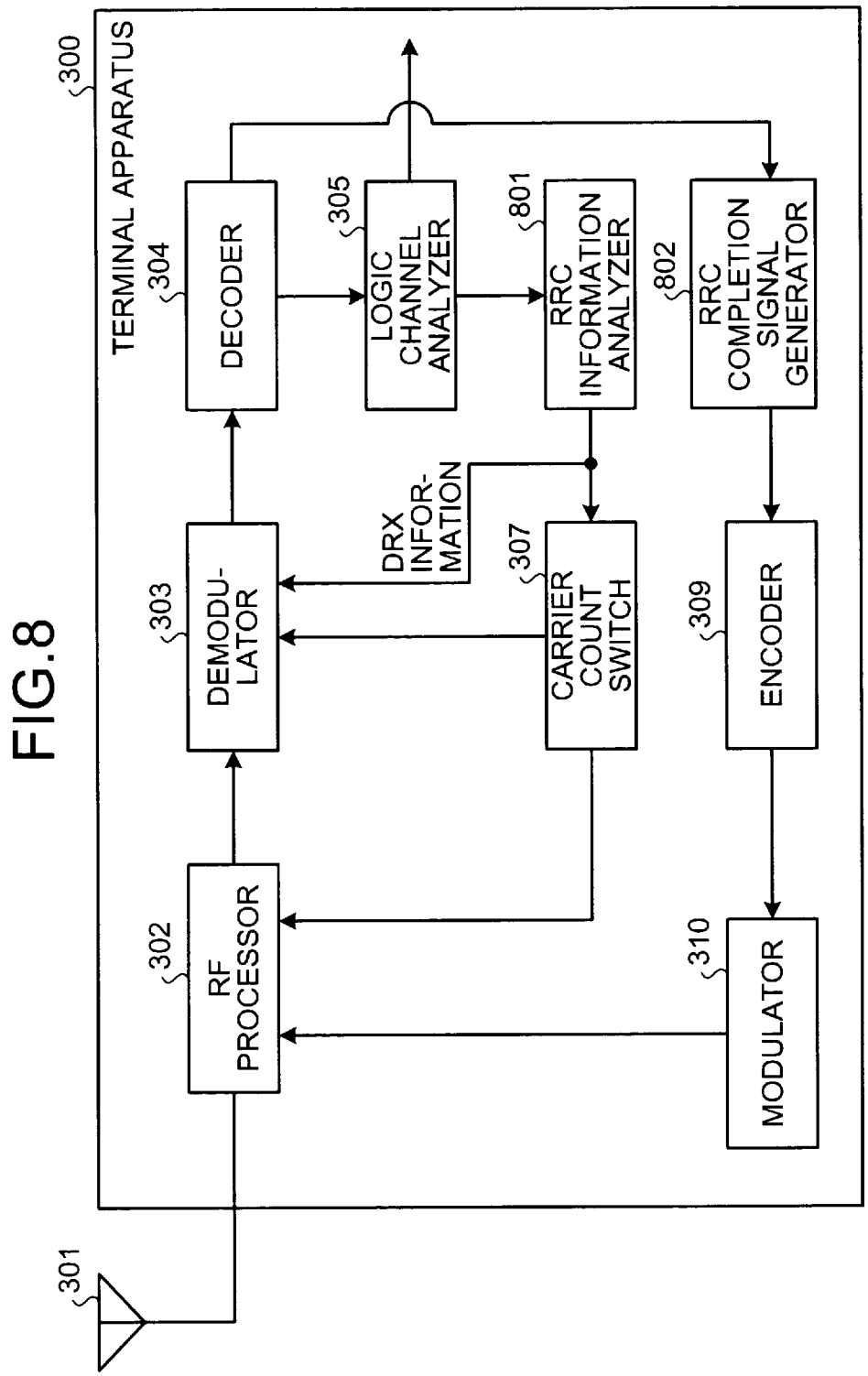
FIG. 8 is a block diagram of configuration of the terminal apparatus according to a third embodiment.

FIG. 8 is a block diagram of configuration of the terminal apparatus according to a third embodiment. In FIG. 8, components identical to those depicted in FIG. 3 are given the same reference numerals used in FIG. 3 and description thereof is omitted. As depicted in FIG. 8, the terminal apparatus 300 according to the third embodiment includes an RRC information analyzer 801 and an RRC completion signal generator 802 in place of the transmission timing controller 306 and the ACK/NACK generator 308 in the configuration depicted in FIG. 3.

The decoder 304 outputs error correction and decoding results to the RRC completion signal generator 802. The logic channel analyzer 305 acquires a radio resource control (RRC) message included in the data output from the decoder 304. The logic channel analyzer 305 outputs the acquired RRC message to the RRC information analyzer 801.

The RRC information analyzer 801 detects DRX (discontinuous reception) information, from the RRC message output from the logic channel analyzer 305. The DRX information includes a DRX setting signal requesting the terminal apparatus 300 to set a DRX cycle and a DRX cancellation signal requesting the terminal apparatus 300 to cancel the set DRX cycle. The RRC information analyzer 801 outputs the detected DRX information to the demodulator 303 and the carrier count switch 307.

The demodulator 303 performs discontinuous reception, based on the DRX information output from the RRC information analyzer 801. For example, when a DRX setting signal is output from the RRC information analyzer 801, the demodulator 303 sets the DRX cycle and performs discontinuous reception, based on DRX setting signal. When a DRX cancellation signal is output from the RRC information analyzer 801, the demodulator 303 cancels the DRX cycle and terminates discontinuous reception.

The carrier count switch 307 switches the communication mode, based on the DRX information output from the RRC information analyzer 801. For example, when a DRX setting signal is output from the RRC information analyzer 801, the carrier count switch 307 switches the communication mode of the terminal apparatus 300 to the multi-carrier mode. When a DRX cancellation signal is output from the RRC information analyzer 801, the demodulator 303 switches the communication mode of the terminal apparatus 300 to the single carrier mode.

The RRC completion signal generator 802 generates an RRC completion signal, based on the error correction and decoding results from the decoder 304. For example, the RRC completion signal generator 802 generates an RRC completion signal when the decoder 304 reports successful correction of errors. The RRC completion signal generator 802 outputs the generated RRC completion signal to the encoder 309.

The encoder 309 encodes the RRC completion signal output from the RRC completion signal generator 802. The encoder 309 outputs the encoded RRC completion signal to the modulator 310. The modulator 310 modulates the RRC completion signal output from the encoder 309. The modulator 310 outputs the modulated RRC completion signal to the RF processor 302. The RF processor 302 converts the frequency of the RRC completion signal output from the modulator 310, from a baseband to a high frequency wave, and outputs the frequency converted RRC completion signal to the antenna 301. The antenna 301 transmits to the base station apparatus 400, the RRC completion signal output from the RF processor 302.

Figure 9:
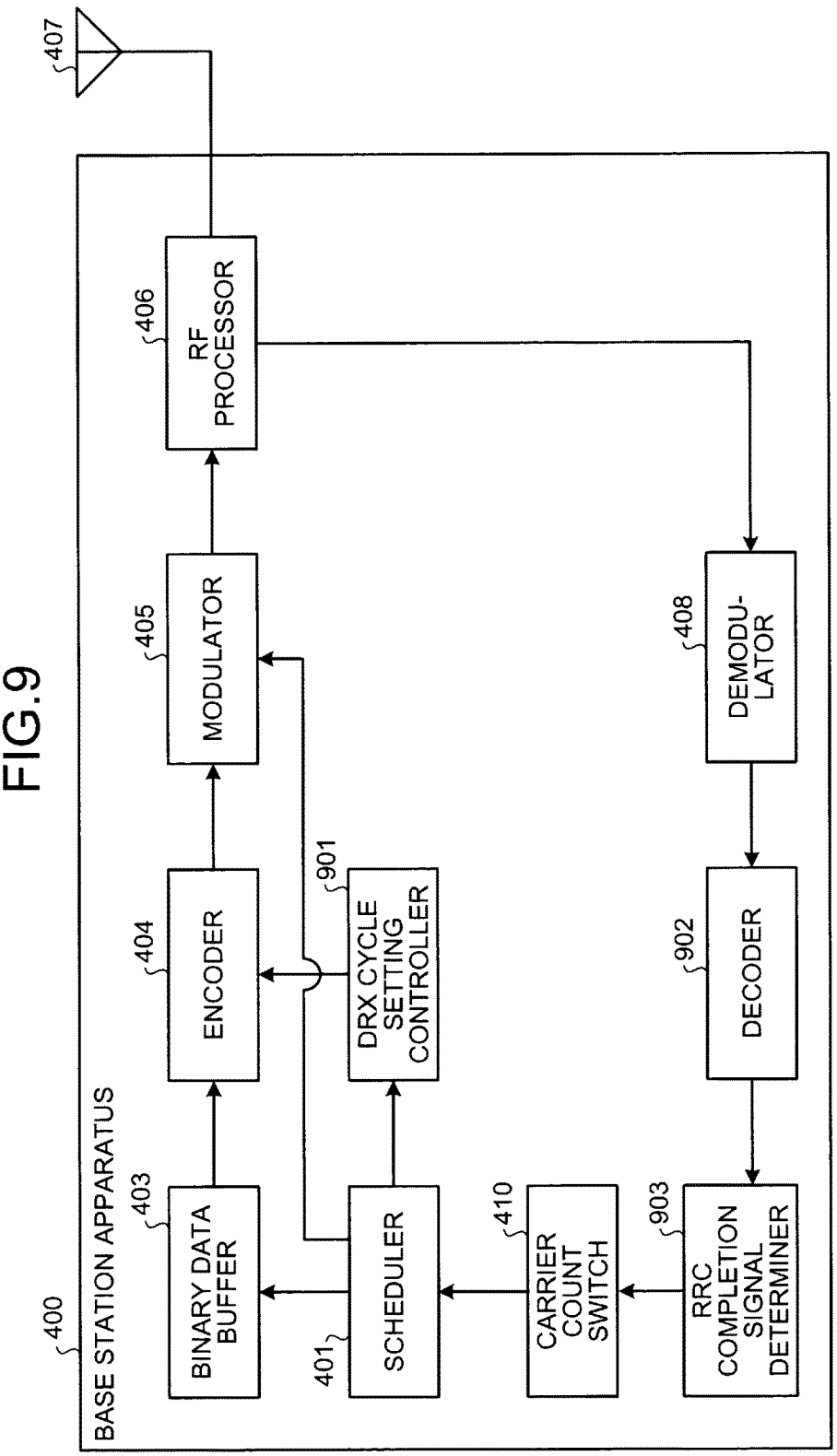
FIG. 9 is a block diagram of a configuration of the base station apparatus according to the third embodiment.

FIG. 9 is a block diagram of a configuration of the base station apparatus according to the third embodiment. In FIG. 9, components identical to those depicted in FIG. 4 are given the same reference numerals used in FIG. 4 and description thereof is omitted. As depicted in FIG. 9, the base station apparatus 400 according to the third embodiment includes a DRX cycle setting controller 901, a decoder 902, and an RRC completion signal determiner 903 in place of the transmission timing controller 402 and the ACK/NACK determiner 409 in the configuration depicted in FIG. 4.

The scheduler 401, in performing scheduling, decides whether to set or cancel the DRX cycle of the terminal apparatus 300. For example, when there is little or no data to be transmitted to the terminal apparatus 300, the scheduler 401 decides to set a DRX cycle for the terminal apparatus 300. When the volume of data to be transmitted to the terminal apparatus 300 is great, the scheduler 401 decides to cancel the DRX cycle set for the terminal apparatus 300.

The scheduler 401 notifies the DRX cycle setting controller 901 and the modulator 405 of the scheduling results. The DRX cycle setting controller 901 generates DRX information, based on the scheduling results from the scheduler 401. DRX information is, for example, a setting signal requesting the terminal apparatus 300 to set a DRX cycle, or a cancellation signal requesting the terminal apparatus 300 to cancel the set DRX cycle.

The DRX cycle setting controller 901 outputs to the encoder 404, an RRC message that includes the generated DRX information. The encoder 404 stores the RRC message output from the DRX cycle setting controller 901 to data output from the binary data buffer 403. The encoder 404 encodes the data to which the RRC has been stored and outputs the encoded data to the modulator 405.

The antenna 407 receives an RRC completion signal transmitted by the terminal apparatus 300 and outputs the RRC completion signal to the RF processor 406. The RF processor 406 converts the frequency of the RRC completion signal output from the antenna 407, from a high frequency wave to a baseband, and outputs the frequency converted RRC completion signal to the demodulator 408. The demodulator 408 demodulates the RRC completion signal output from the RF processor 406 and outputs the demodulated RRC completion signal to the decoder 902.

The decoder 902 decodes the RRC completion signal output from the demodulator 408. The decoder 902 outputs the decoded RRC completion signal to the RRC completion signal determiner 903. The RRC completion signal determiner 903 makes a determination about the RRC completion signal output from the decoder 902. For example, the RRC completion signal determiner 903 determines whether the RRC completion signal is an RRC completion signal that is in response to a DRX setting signal, or an RRC completion signal that is in response to a DRX cancellation signal. The RRC completion signal determiner 903 notifies the carrier count switch 410 of the determination results.

The carrier count switch 410 switches the communication mode of the base station apparatus 400, based on the determination results from the RRC completion signal determiner 903. For example, when the RRC completion signal determiner 903 reports acquisition of an RRC completion signal that is in response to a DRX setting signal, the carrier count switch 410 switches the communication mode to the single carrier mode. When the RRC completion signal determiner 903 reports the acquisition of an RRC completion signal that is in response to a DRX cancellation signal, the carrier count switch 410 switches the communication mode to the multi-carrier mode.

Figure 10:
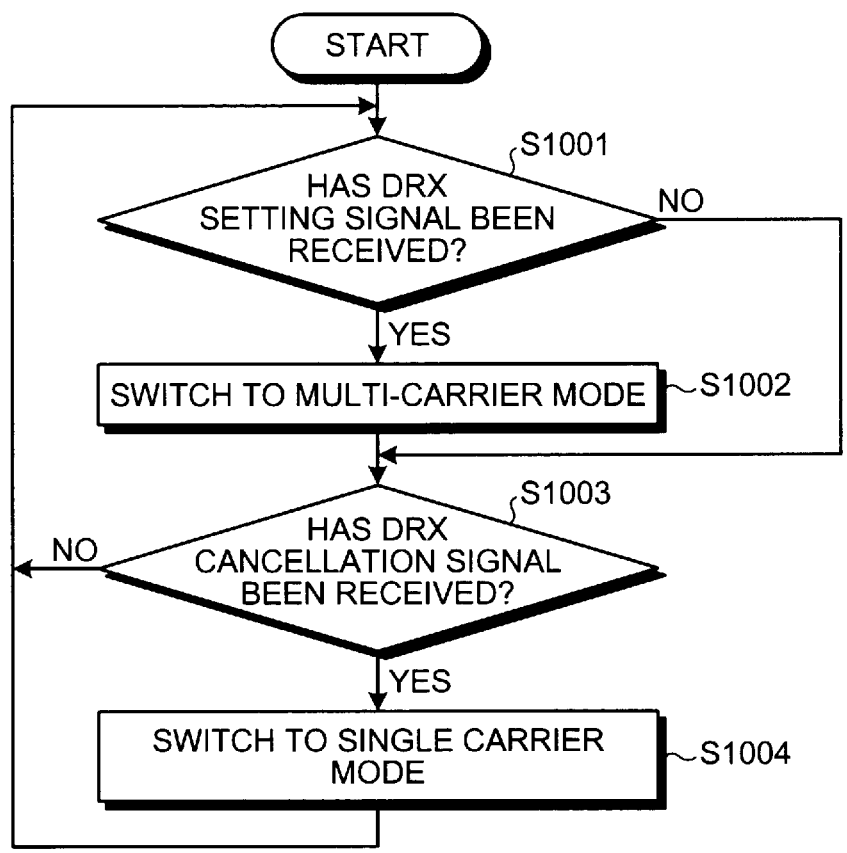
FIG. 10 is a flowchart of an example of operations of the terminal apparatus according to the third embodiment.

FIG. 10 is a flowchart of an example of operations of the terminal apparatus according to the third embodiment. The terminal apparatus 300 (see FIG. 8), for example, performs the following operations. As depicted in FIG. 10, the carrier count switch 307 determines whether a DRX setting signal from the base station apparatus 400 has been received (step S1001). If a DRX setting signal has not been received (step S1001: NO), the flow proceeds to step S1003.

At step S1001, if a DRX setting signal from the base station apparatus 400 has been received (step S1001: YES), the carrier count switch 307 switches the communication mode of the terminal apparatus 300 to the multi-carrier mode (step S1002). Subsequently, the carrier count switch 307 determines whether a DRX cancellation signal from the base station apparatus 400 has been received (step S1003).

At step S1003, if a DRX cancellation signal has not been received (step S1003: NO), the flow returns to step S1001 and the operations therefrom are continued. If a DRX cancellation signal has been received (step S1003: YES), the carrier count switch 307 switches the communication mode of the terminal apparatus 300 to the single carrier mode (step S1004), the flow returns to step S1001 and the operations therefrom are continued. By performing the operations above, the terminal apparatus 300 can switch the communication mode, based on the acquired setting signal and cancellation signal.

Figure 11:
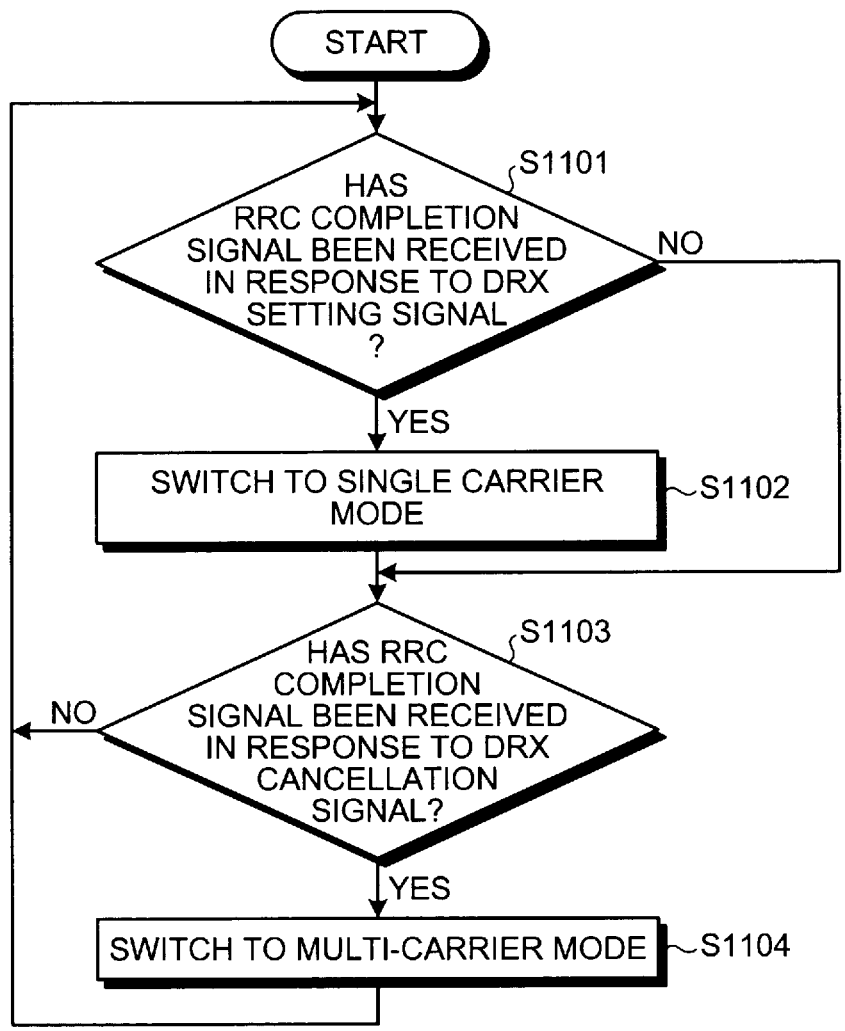
FIG. 11 is a flowchart of an example of operations of the base station apparatus according to the third embodiment.

FIG. 11 is a flowchart of an example of operations of the base station apparatus according to the third embodiment. The base station apparatus 400 (see FIG. 9), for example, performs the following operations. As depicted in FIG. 11, the RRC completion signal determiner 903 determines whether an RRC completion signal has been received in response to the DRX setting signal transmitted to the terminal apparatus 300 (step S1101). If an RRC completion signal has not been received in response to the DRX setting signal (step S1101: NO), the flow proceeds to step S1103.

At step S1101, if an RRC completion signal has been received in response to the DRX setting signal (step S1101: YES), the carrier count switch 410 switches the communication mode of the base station apparatus 400 to the single carrier mode (step S1102). Subsequently, the RRC completion signal determiner 903 determines whether an RRC completion signal has been received in response to the DRX cancellation signal transmitted to the terminal apparatus 300 (step S1103).

At step S1103, if an RRC completion signal has not been received in response to the DRX cancellation signal (step S1103: NO), the flow returns to step S1101 and the operations therefrom are continued. If an RRC completion signal has been received in response to the DRX cancellation signal (step S1103: YES), the carrier count switch 410 switches the communication mode of the base station apparatus 400 to the multi-carrier mode (step S1104), and the flow returns to step S1101 and the operations therefrom are continued. By performing the operations above, the base station apparatus 400 can switch the communication mode, based on an RRC completion signal that is in response to the DRX setting signal and the DRX cancellation signal.

In this manner, the terminal apparatus 300 according to the third embodiment acquires a DRX setting signal requesting the terminal apparatus 300 to set a DRX cycle and a DRX cancellation signal requesting the terminal apparatus 300 to cancel the set DRX cycle. The terminal apparatus 300 switches the communication mode, based on the acquired DRX setting signal and DRX cancellation signal.

As a result, since an existing DRX setting signal and DRX cancellation signal can be used as information indicating a change in the communication state, communication resources can be used efficiently without new control information being communicated to/from the base station apparatus 400.

For example, since the possibility of data being transmitted from the base station apparatus 400 is high when the DRX cycle is cancelled, upon receiving a DRX cancellation signal, the terminal apparatus 300 switches to the multi-carrier mode, thereby enabling communication of high throughput to be performed. Further, since the possibility of data being transmitted from the base station apparatus 400 is low when the DRX cycle is set, upon receiving a DRX setting signal, the terminal apparatus 300 switches to the single carrier mode, enabling power consumption to be suppressed.

The base station apparatus 400 according to the third embodiment acquires an RRC completion signal that is from the terminal apparatus 300 and in response to a DRX setting signal or a DRX cancellation signal transmitted to the terminal apparatus 300; and based on the acquired RRC completion signal, the base station apparatus 400 switches the communication mode. Consequently, since an existing RRC completion signal can be used as information indicating a change in the communication state, communication resources can be used efficiently without new control information being communicated to/from the terminal apparatus 300.

For example, when an RRC completion signal that is from the terminal apparatus 300 and in response to the DRX cancellation signal transmitted to the terminal apparatus 300 is acquired, the base station apparatus 400 switches to the multi-carrier mode. When an RRC completion signal that is from the terminal apparatus 300 and in response to the DRX setting signal transmitted to the terminal apparatus 300 is acquired, the base station apparatus 400 switches to the single carrier mode. Consequently, since the communication mode is switched after confirmation of the DRX cancellation signal (or the DRX setting signal) being properly received by the terminal apparatus 300, the communication mode of the base station apparatus 400 can be switched in conjunction with the switching of communication modes by the terminal apparatus 300.

Figure 12:
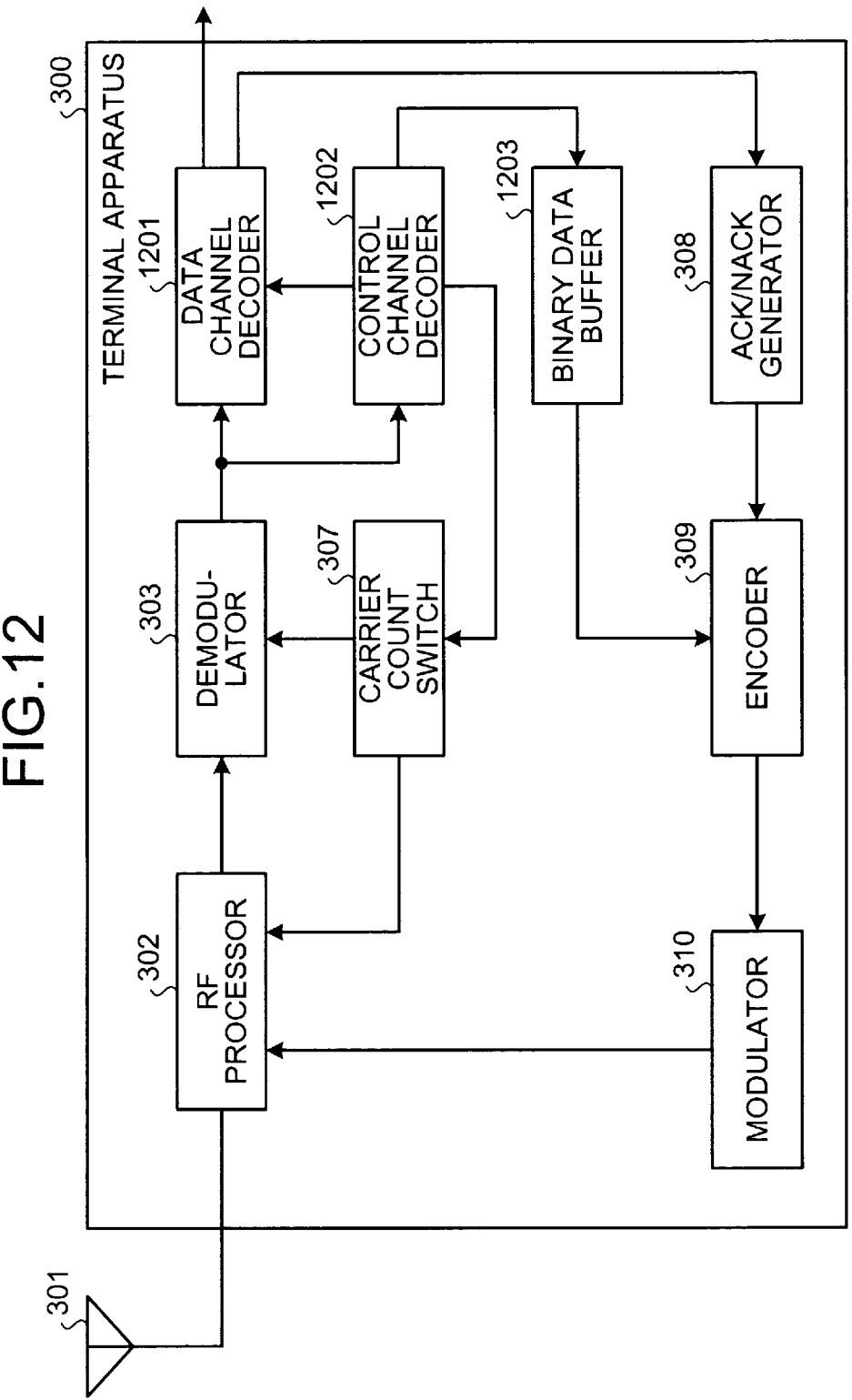
FIG. 12 is a block diagram of a configuration of the terminal apparatus according to a fourth embodiment.

FIG. 12 is a block diagram of a configuration of the terminal apparatus according to a fourth embodiment. In FIG. 12, components identical to those depicted in FIG. 3 are given the same reference numerals used in FIG. 3 and description thereof is omitted. The terminal apparatus 300 according to the fourth embodiment includes a data channel decoder 1201, a control channel decoder 1202, and a binary data buffer 1203 in place of the decoder 304, the logic channel analyzer 305, and the transmission timing controller 306 in the configuration depicted in FIG. 3.

The demodulator 303 outputs demodulated data to the channel decoder 1201 and the control channel decoder 1202. The data channel decoder 1201, based on reception allocation information output from the control channel decoder 1202, decodes a data channel included in the signal output from the demodulator 303. For example, the data channel decoder 1201 performs error correction and decoding on the signal and notifies the ACK/NACK generator 308 of the results of the error correction and decoding. The data channel decoder 1201 further outputs the decoded data downstream.

The control channel decoder 1202 decodes a control channel included in the signal output from the demodulator 303. The control channel included in the signal output from the demodulator 303 includes information that indicates the communication resources allocated to the terminal apparatus 300. Allocation information is, for example, reception allocation information that indicates the communication resources allocated for data reception, by the terminal apparatus 300; or transmission allocation information that indicates the communication resources allocated for data transmission, by the terminal apparatus 300.

The control channel decoder 1202 acquires, as information indicating a change in the communication state, the reception allocation information and the transmission allocation information included in the control channel. Upon acquiring reception allocation information, the control channel decoder 1202 outputs the acquired reception allocation information to the data channel decoder 1201 and notifies the carrier count switch 307 of the acquisition of the reception allocation information. Upon acquiring transmission allocation information, the control channel decoder 1202 notifies the carrier count switch 307 of the acquisition of the transmission allocation information.

Upon acquiring transmission allocation information, the control channel decoder 1202 outputs to the binary data buffer 1203, an output instruction instructing the output of data of a volume corresponding to the communication resources indicated by the transmission allocation information. The binary data buffer 1203 stores therein data (user data) for transmissions to the base station apparatus 400. When an output instruction is output from the control channel decoder 1202, the binary data buffer 1203 outputs to the encoder 309 and according to the volume indicated by the output instruction, a portion of the data stored therein.

The carrier count switch 307 switches the communication mode of the terminal apparatus 300, based on the notification of the acquisition of reception allocation information or transmission allocation information by the control channel decoder 1202. For example, upon notification of the acquisition of reception allocation information or transmission allocation information from the control channel decoder 1202, the carrier count switch 307 sets the communication mode to the multi-carrier mode.

The carrier count switch 307 has a function of a timer that times a given period (e.g., of a few seconds) that starts upon notification of the acquisition of reception allocation information or transmission allocation information from the control channel decoder 1202. When the given period, which starts upon notification of the acquisition of reception allocation information or transmission allocation information from the control channel decoder 1202, has elapsed according to the timer, the carrier count switch 307 sets the communication mode to the single carrier mode.

While the timer is in operation, if the control channel decoder 1202 gives further notification that reception allocation information or transmission allocation information has been acquired, the carrier count switch 307 may reset the timer. In this case, the carrier count switch 307 sets the communication mode to the single carrier mode upon the elapse of the given period after the resetting of the timer.

The ACK/NACK generator 308 generates a delivery confirmation signal, based on the error correction and decoding results from the data channel decoder 1201. The encoder 309 encodes the delivery confirmation signal output from the ACK/NACK generator 308 and outputs the encoded delivery confirmation signal to the modulator 310. The encoder 309 further encodes the data output from the binary data buffer 1203 and outputs the encoded data to the modulator 310.

The modulator 310 modulates the data output from the encoder 309 and outputs the modulated data to the RF processor 302. The antenna 301 transmits to the base station apparatus 400, the delivery confirmation signal and data output from the RF processor 302. The RF processor 302 converts the frequency of the delivery confirmation signal and data output from the modulator 310, from a baseband to a high frequency wave, and outputs the frequency converted delivery confirmation signal and data to the antenna 301.

Figure 13:
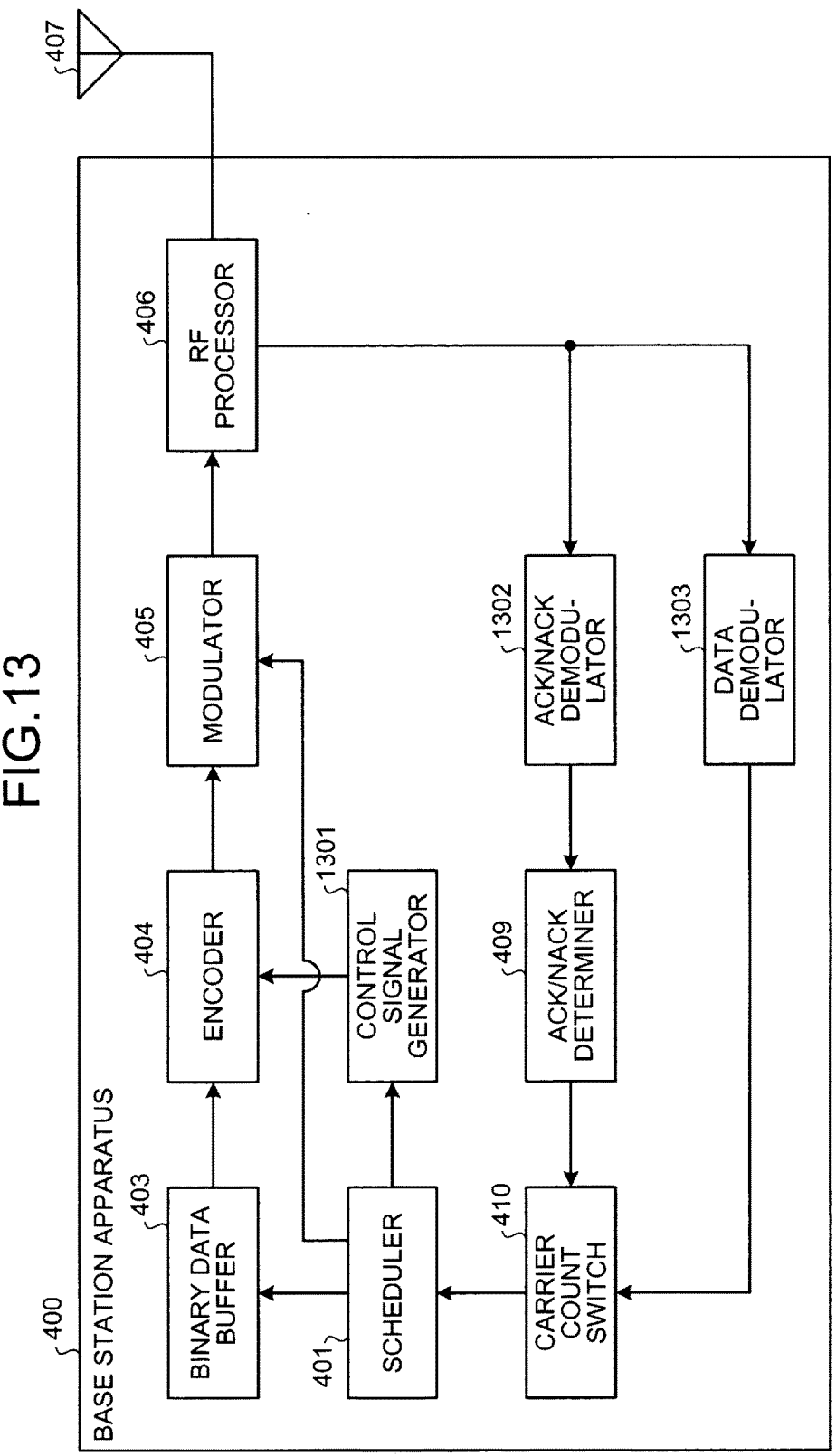
FIG. 13 is a block diagram of a configuration of the base station apparatus according to the fourth embodiment.

FIG. 13 is a block diagram of a configuration of the base station apparatus according to the fourth embodiment. In FIG. 13, components identical to those depicted in FIG. 4 are given the same reference numerals used in FIG. 4 and description thereof is omitted. As depicted in FIG. 13, the base station apparatus 400 according to the fourth embodiment includes a control signal generator 1301, an ACK/NACK demodulator 1302, and a data demodulator 1303 in place of the transmission timing controller 402 and the demodulator 408 in the configuration depicted in FIG. 4.

The scheduler 401 notifies the control signal generator 1301 and the modulator 405 of the scheduling results. The control signal generator 1301 generates a control signal, based on the scheduling results from the scheduler 401. For example, the control signal generator 1301 generates reception allocation information, which indicates the communication resources allocated for data reception, by the terminal apparatus 300. The control signal generator 1301 further generates transmission allocation information, which indicates the communication resources allocated for data transmission, by the terminal apparatus 300.

The control signal generator 1301 outputs the generated control signal to the encoder 404, as a control channel. The encoder 404 encodes the control channel output from the transmission timing controller 402 and outputs the encoded data to the modulator 405. The modulator 405 modulates the control channel output from the encoder 404.

The RF processor 406 converts the frequency of the delivery confirmation signal output from the antenna 407, from a high frequency wave to a baseband, and outputs the frequency converted delivery confirmation signal to the ACK/NACK demodulator 1302 and the data demodulator 1303. The antenna 407 receives a signal transmitted by the terminal apparatus 300 and outputs the signal to the RF processor 406.

The ACK/NACK demodulator 1302 demodulates the delivery confirmation signal included in the signal output from the RF processor 406 and outputs the demodulated delivery confirmation signal to the ACK/NACK determiner 409. The data demodulator 1303 demodulates the data included in the signal output from the RF processor 406 and outputs the demodulated data to the carrier count switch 410. The carrier count switch 410 switches the communication mode of the base station apparatus 400, based on determination results from the ACK/NACK determiner 409 and the data output from the data demodulator 1303.

For example, upon receiving from the ACK/NACK determiner 409, determination results indicating that an ACK signal has been received in response to the reception allocation information transmitted by the base station apparatus 400 to the terminal apparatus 300, the carrier count switch 410 switches the communication mode to the multi-carrier mode. Further, when data transmitted by the terminal apparatus 300 is output from the data demodulator 1303, the carrier count switch 410 switches the communication mode to the multi-carrier mode.

The carrier count switch 410 has a function of a timer that times a given period that starts upon the switching of the communication mode to the multi-carrier mode. When the given period, which starts upon the switching of the communication mode to the multi-carrier mode, has elapsed according to the timer, the carrier count switch 410 switches the communication mode to the single carrier mode.

Figure 14:
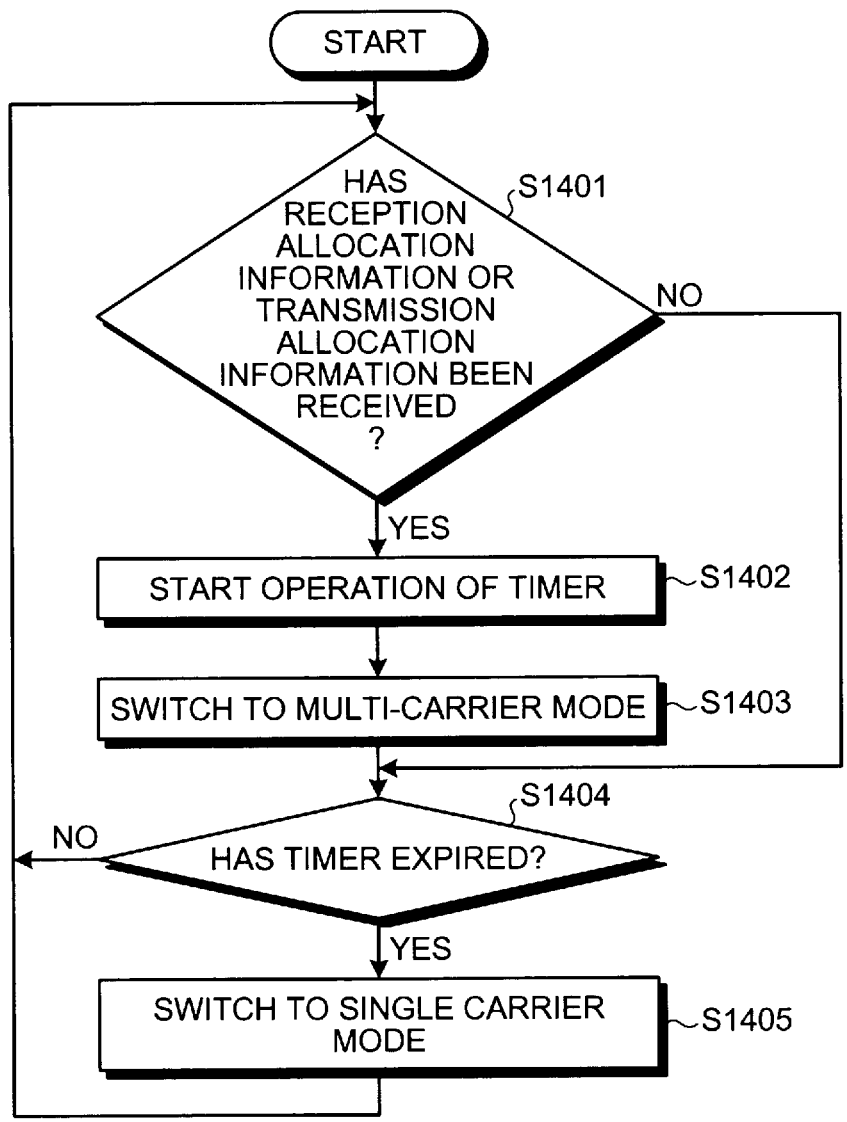
FIG. 14 is a flowchart of an example of operations of the terminal apparatus according to the fourth embodiment.

FIG. 14 is a flowchart of an example of operations of the terminal apparatus according to the fourth embodiment. The terminal apparatus 300 (see FIG. 12), for example, performs the following operations. As depicted in FIG. 14, the carrier count switch 307 determines whether allocation information (reception allocation information or transmission allocation information) from the base station apparatus 400 has been received (step S1401).

At step S1401, if allocation information (reception allocation information or transmission allocation information) has not been received (step S1401: NO), the flow proceeds to step S1404. If allocation information (reception allocation information or transmission allocation information) from the base station apparatus 400 has been received (step S1401:

YES), the carrier count switch 307 starts operation of the timer, which times the given period (step S1402). The carrier count switch 307 switches the communication mode of the terminal apparatus 300 to the multi-carrier mode (step S1403).

The carrier count switch 307, determines whether the period of the timer started at step S1402 has expired (step S1404). If the period of the timer has not expired (step S1404: NO), the flow returns to step S1401 and the operations therefrom are continued. If the period of the timer has expired (step S1404: YES), the carrier count switch 307 switches the communication mode of the terminal apparatus 300 to the single carrier mode (step S1405); the flow returns to step S1401 and the operations therefrom are continued. By performing the operations above, the terminal apparatus 300 can switch the communication mode, based on allocation information indicating the communication resources that have been allocated to the terminal apparatus 300.

Figure 15:
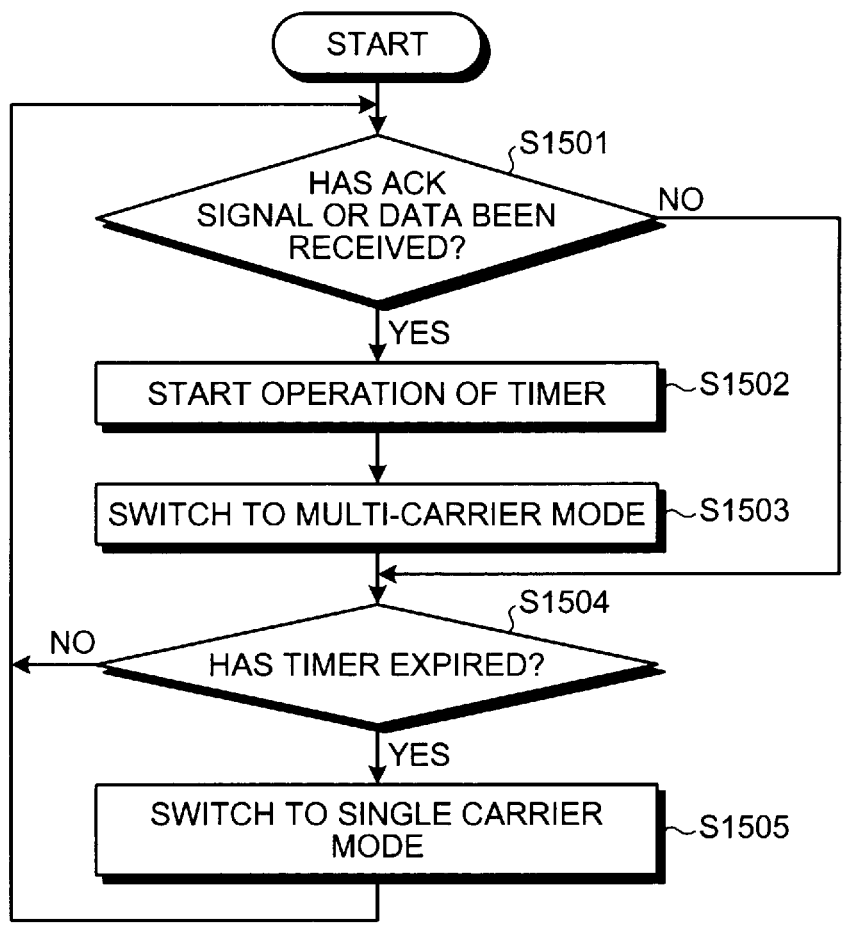
FIG. 15 is a flowchart of an example of operations of the base station apparatus according to the fourth embodiment.

FIG. 15 is a flowchart of an example of operations of the base station apparatus according to the fourth embodiment. The base station apparatus 400 (see FIG. 13), for example, performs the following operations. As depicted in FIG. 15, the carrier count switch 410 determines if an ACK signal in response to reception allocation information or transmission allocation information transmitted to the terminal apparatus 300, or data transmitted by the terminal apparatus 300 has been received (step S1501).

At step S1501, if neither an ACK signal nor data has been received (step S1501: NO), the flow proceeds to step S1504. If an ACK signal or data has been received (step S1501: YES), the carrier count switch 410 starts operation of the timer, which times the given period (step S1502).

The carrier count switch 410 switches the communication mode in the scheduler 401 to the multi-carrier mode (step S1503). Subsequently, the carrier count switch 410 determines whether the period of the timer started at the step S1502 has expired (step S1504).

At step S1504, if the period of the timer has not expired (step S1504: NO), the flow returns to step S1501 and the operations therefrom are continued. If the period of the timer has expired (step S1504: YES), the carrier count switch 410 switches the communication mode in the scheduler 401 to the single carrier mode (step S1505); and the flow returns to step S1501 and the operations therefrom are continued.

By performing the operations above, the base station apparatus 400 can switch the communication mode, based on the delivery confirmation signal that is in response to reception allocation information or transmission allocation information transmitted to the terminal apparatus 300. Further, the base station apparatus 400 can switch the communication mode, based on data that has been transmitted by the terminal apparatus 300, based on transmission allocation information transmitted to the terminal apparatus 300.

Figure 16:
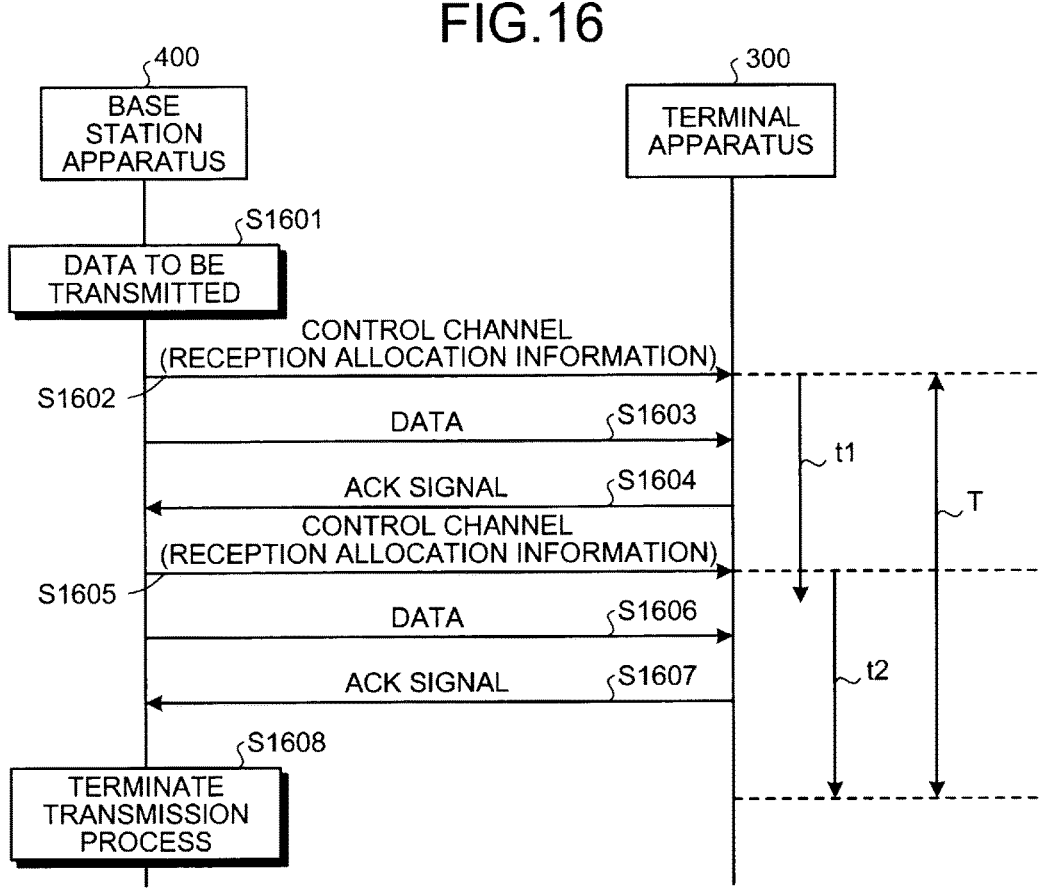
FIG. 16 is a sequence diagram of an example of operations of the communication system according to the fourth embodiment.

FIG. 16 is a sequence diagram of an example of operations of the communication system according to the fourth embodiment. When there is data to be transmitted at the base station apparatus 400 (step S1601), the base station apparatus 400 transmits a control channel to the terminal apparatus 300 (step S1602). The control channel transmitted at step S1602 includes reception allocation information.

Period t1 represents a given period that starts when the terminal apparatus 300 receives the reception allocation information transmitted at step S1602. Next, the base station apparatus 400 transmits to the terminal apparatus 300, a portion of the transmission data at step S1601 (step S1603). The terminal apparatus 300 transmits to the base station apparatus 400, an ACK signal in response to the data transmitted at step S1603 (step S1604).

The base station apparatus 400 transmits a control channel to the terminal apparatus 300 (step S1605). The control channel transmitted at step S1605 includes reception allocation information. Period t2 represents a given period that starts when the terminal apparatus 300 receives the reception allocation information transmitted at step S1605. The base station apparatus 400 transmits to the terminal apparatus 300, data that has not yet been transmitted among the transmission data at step S1601 (step S1606).

The terminal apparatus 300 transmits to the base station apparatus 400, an ACK signal in response to the data transmitted at step S1606 (step S1607). Here, it is assumed that all of the transmission data at step S1601 has been received by the terminal apparatus 300 through the steps above. Subsequently, the base station apparatus 400 terminates the transmission process (step S1608), ending the series of operations.

During the steps above, the communication modes of the terminal apparatus 300 and the base station apparatus 400 are set as the multi-carrier mode during period T when at least one of the periods t1 and t2 is being timed. Further, during periods outside the period T, the communication modes of the terminal apparatus 300 and the base station apparatus 400 are sets as the single carrier mode.

In FIG. 16, an example where the data transmitted at step S1603 and step S1606 is properly received by the terminal apparatus 300 and an ACK signal is transmitted by the terminal apparatus 300 to the base station apparatus 400 has been described. In contrast, when the data is not properly received by the terminal apparatus 300 and a NACK signal is transmitted by the terminal apparatus 300 to the base station apparatus 400, the base station apparatus 400 again transmits the data to the terminal apparatus 300.

Configuration may be such that at the base station apparatus 400, the timing of period t1 begins when an ACK signal (not depicted) that is from the terminal apparatus 300 and in response to the transmitted control channel is received. In this case as well, for example, when data is transmitted at step S1603 and step S1606, the communication mode can be switched to the multi-carrier mode.

Further, configuration may be such that at the base station apparatus 400, the timing of period t1 begins upon the reception (step S1604) of an ACK signal that is from the terminal apparatus 300 and in response to the data transmitted at step S1603. In this case, for example, when data is transmitted at step S1606, the communication mode can be switched to the multi-carrier mode.

As depicted in FIG. 16, the base station apparatus 400 periodically transmits a control channel to the terminal apparatus 300 during the data transmission process, whereby during the data transmission process, the multi-carrier modes of the terminal apparatus 300 and the base station apparatus 400 can be switched, enabling communication of high throughput to be performed.

Upon completing the data transmission process, the base station apparatus 400 suspends the transmission of the control channel. Consequently, after the data transmission process, the valid period of the control channel expires and the terminal apparatus 300 and the base station apparatus 400 are switched to the single carrier mode, thereby enabling power consumption of the terminal apparatus 300 and the base station apparatus 400 to be suppressed.

In this manner, the terminal apparatus 300 according to fourth embodiment acquires allocation information (reception allocation information or transmission allocation information) indicating the communication resources allocated to the terminal apparatus 300; and based on the acquired allocation information, the terminal apparatus 300 switches the communication mode. Consequently, since existing allocation information can be used as information indicating a change in the communication state, communication resources can be used efficiently without new control information being communicated to/from the base station apparatus 400.

For example, after reception of reception allocation information, the possibility of data being transmitted from the base station apparatus 400 is high and therefore, if reception allocation information is received, the terminal apparatus 300 switches to the multi-carrier mode, thereby enabling communication of high throughput to be performed. After transmission allocation information is received, the possibility of data being transmitted from the terminal apparatus 300 is high and therefore, if transmission allocation information is received, the terminal apparatus 300 switches to the multi-carrier mode, enabling communication of high throughput to be performed.

The possibility that transmission will be recursively performed at the given period after reception allocation information or transmission allocation information is received, is high. For example, when a webpage is browsed using the terminal apparatus 300, after the designated page is accessed, the possibility that another page will be accessed from a link in the initial page is high.

Consequently, the terminal apparatus 300 can switch to the multi-carrier mode at the given period, which begins upon the reception of reception allocation information or transmission allocation information. As a result, communication of high throughput can be performed. The terminal apparatus 300 can switch to the single carrier mode upon the elapse of the given period, which begins upon the reception of reception allocation information or transmission allocation information. As a result, power consumption can be suppressed.

The base station apparatus 400 according to the fourth embodiment acquires a delivery confirmation signal that is from the terminal apparatus 300 and in response to allocation information (reception allocation information or transmission allocation information) transmitted to the terminal apparatus 300; and based on the acquired delivery confirmation signal, the base station apparatus 400 switches the communication mode. Consequently, since an existing delivery confirmation signal can be used as information indicating a change in the communication state, communication resources can be used efficiently without new control information being communicated to/from the terminal apparatus 300.

For example, when a delivery confirmation signal that is from the terminal apparatus 300 and in response to allocation information transmitted to the terminal apparatus 300 is received, the base station apparatus 400 switches to the multi-carrier mode. Further, when the given period, which begins upon the acquisition of a delivery confirmation signal that is from the terminal apparatus 300 and in response to allocation information transmitted to the terminal apparatus 300, has elapsed, the base station apparatus 400 switches to the single carrier mode. Consequently, since the communication mode is switched after confirmation of the allocation information being properly received by the terminal apparatus 300, the communication mode of the base station apparatus 400 can be switched in conjunction with the switching of communication modes by the terminal apparatus 300.

The base station apparatus 400 according to fourth embodiment acquires data that has been transmitted by the terminal apparatus 300, based on transmission allocation information transmitted to the terminal apparatus 300; and based on the acquired data, the base station apparatus 400 switches the communication mode. Consequently, since existing data can be used as information indicating a change in the communication state, communication resources can be used efficiently without new control information being communicated to/from the terminal apparatus 300.

For example, when data that has been transmitted by the terminal apparatus 300, based on allocation information transmitted to the terminal apparatus 300, is acquired, the base station apparatus 400 switches to the multi-carrier mode. Further, when the given period, which begins upon the acquisition of data that has been transmitted by the terminal apparatus 300, based on allocation information transmitted to the terminal apparatus 300, has elapsed, the base station apparatus 400 switches to the single carrier mode. Consequently, since the communication mode is switched after confirmation of the allocation information being properly received by the terminal apparatus 300, the communication mode of the base station apparatus 400 can be switched in conjunction with the switching of communication modes by the terminal apparatus 300.

Figure 17:
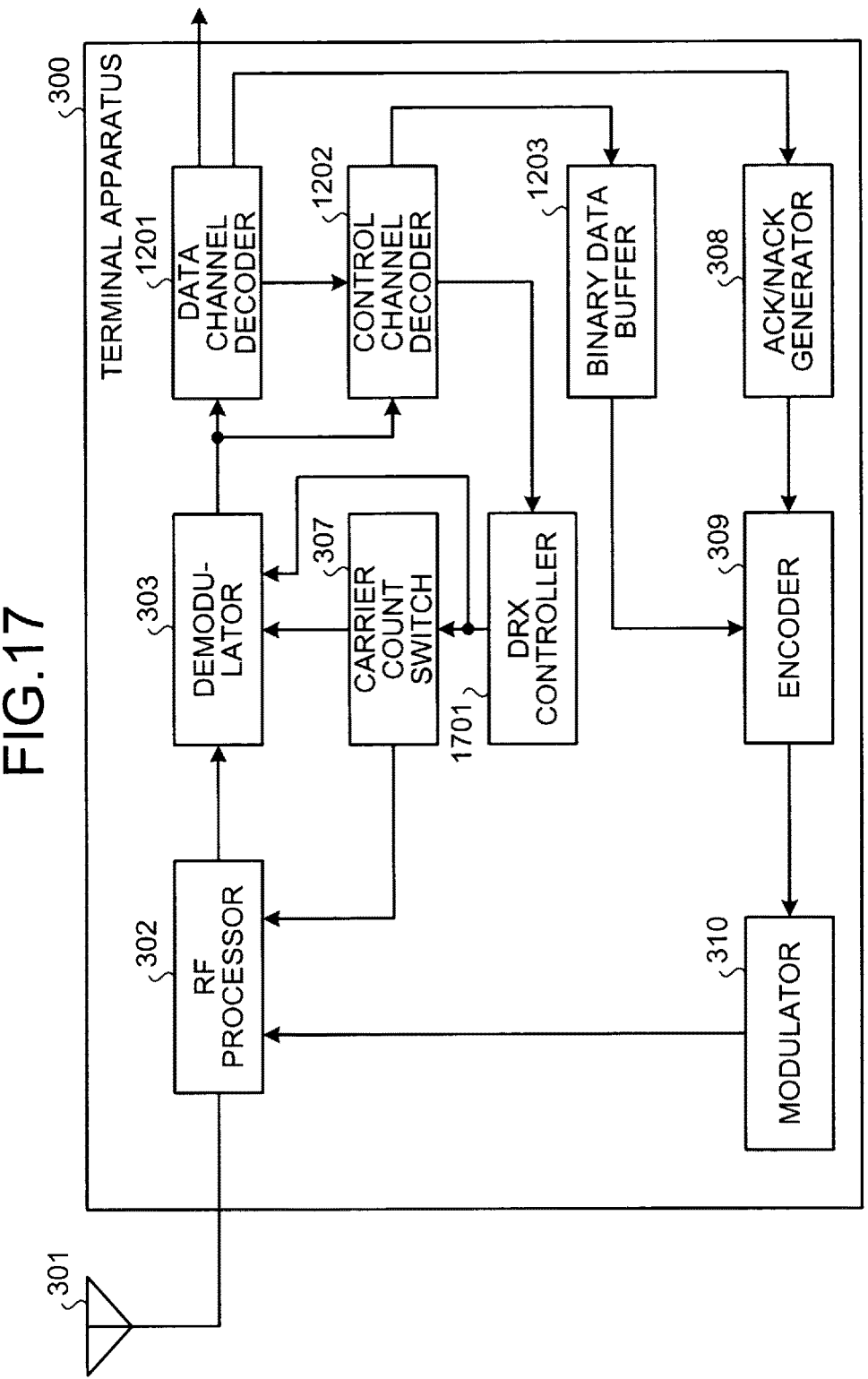
FIG. 17 is a block diagram of a configuration of the terminal apparatus according to a fifth embodiment.

FIG. 17 is a block diagram of a configuration of the terminal apparatus according to a fifth embodiment. In FIG. 17, components identical to those depicted in FIG. 12 are given the same reference numerals used in FIG. 12 and description thereof is omitted. As depicted in FIG. 17, the terminal apparatus 300 according to the fifth embodiment includes a DRX controller 1701 in addition to the configuration of the terminal apparatus 300 depicted in FIG. 12.

The control channel decoder 1202 outputs a decoded control channel to the DRX controller 1701. The DRX controller 1701 has a function of a DRX inactivity timer (discontinuous reception inactivity timer) that operates based on the control channel output from the control channel decoder 1202. The DRX inactivity timer is a timer that times the DRX inactivity period of the terminal apparatus 300, and for example, is a DRX inactivity timer prescribed under LTE.

While the DRX inactivity timer is in operation, the DRX controller 1701 controls the demodulator 303 to inactivate DRX and receive a continuous control channel. When the operation of the DRX inactivity timer ends, the DRX controller 1701 controls the demodulator 303 to perform DRX. The DRX controller 1701 further acquires, as information indicating a change in the communication state, timer information that indicates the operation state of the DRX inactivity timer. The DRX controller 1701 outputs the acquired timer information to the carrier count switch 307.

The carrier count switch 307 switches the communication mode of the terminal apparatus 300, based on the timer information from the DRX controller 1701. For example, based on the timer information, when the timing of the DRX inactivity period by the DRX inactivity timer of the DRX controller 1701 starts, the carrier count switch 307 switches the communication mode to the multi-carrier mode. Further based on the timer information, when the timing of the DRX inactivity period by the DRX inactivity timer ends, the carrier count switch 307 switches the communication mode to the single carrier mode.

The base station apparatus 400 according to the fifth embodiment may have, for example, the base station apparatus 400 configuration depicted in FIG. 9. In this case, the base station apparatus 400, for example, can initiate the operation of the DRX inactivity timer of the terminal apparatus 300 by transmitting a DRX cancellation signal to the terminal apparatus 300.

Figure 18:
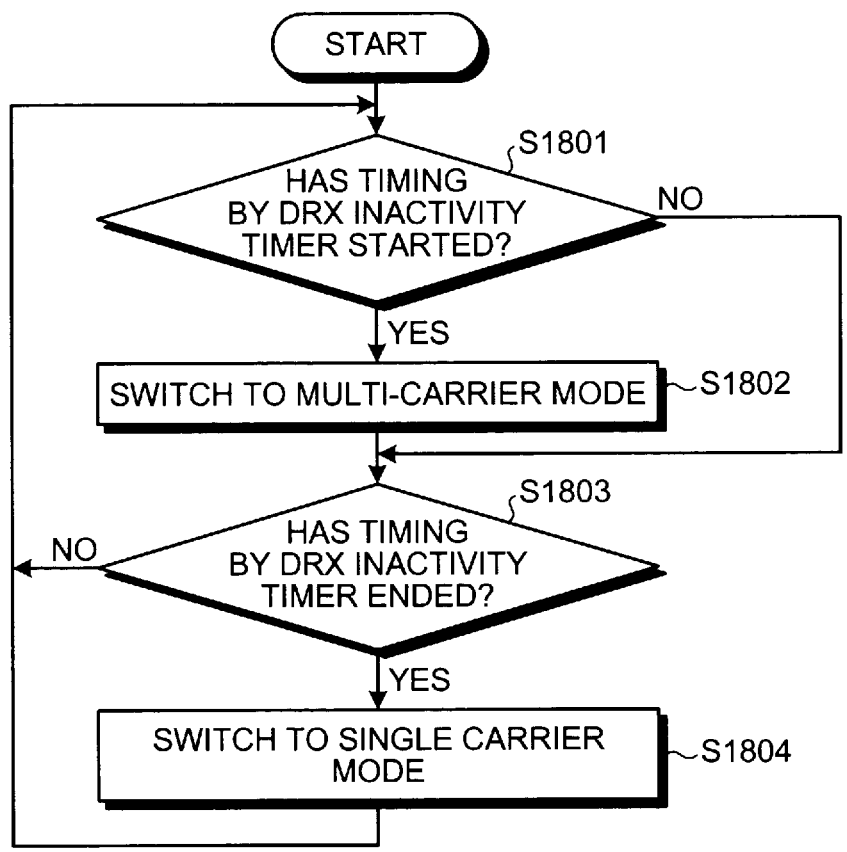
FIG. 18 is a flowchart of an example of operations of the terminal apparatus according to the fifth embodiment.

FIG. 18 is a flowchart of an example of operations of the terminal apparatus according to the fifth embodiment. The terminal apparatus 300 (see FIG. 17), for example, performs the following operations. As depicted in FIG. 18, the carrier count switch 307 determines whether timing of the DRX inactivity period by the DRX has started (step S1801). If the timing by the DRX inactivity timer has not started (step S1801: NO), the flow proceeds to step S1803.

At step S1801, if the timing by the DRX has started (step S1801: YES), the carrier count switch 307 switches the communication mode of the terminal apparatus 300 to the multi-carrier mode (step S1802). Next, the carrier count switch 307 determines whether the timing of the DRX inactivity period by the DRX inactivity timer has ended (step S1803).

At step S1803, if the timing by the DRX inactivity timer has not ended (step S1803: NO), the flow returns to step S1801 and operations therefrom are performed. If the timing by the DRX inactivity timer has ended (step S1803: YES), the carrier count switch 307 switches the communication mode of the terminal apparatus 300 to the single carrier mode (step S1804); and the flow returns to step S1801 and the operations therefrom are continued. By performing the operations above, the terminal apparatus 300 can switch the communication mode, based on timer information.

Figure 19:
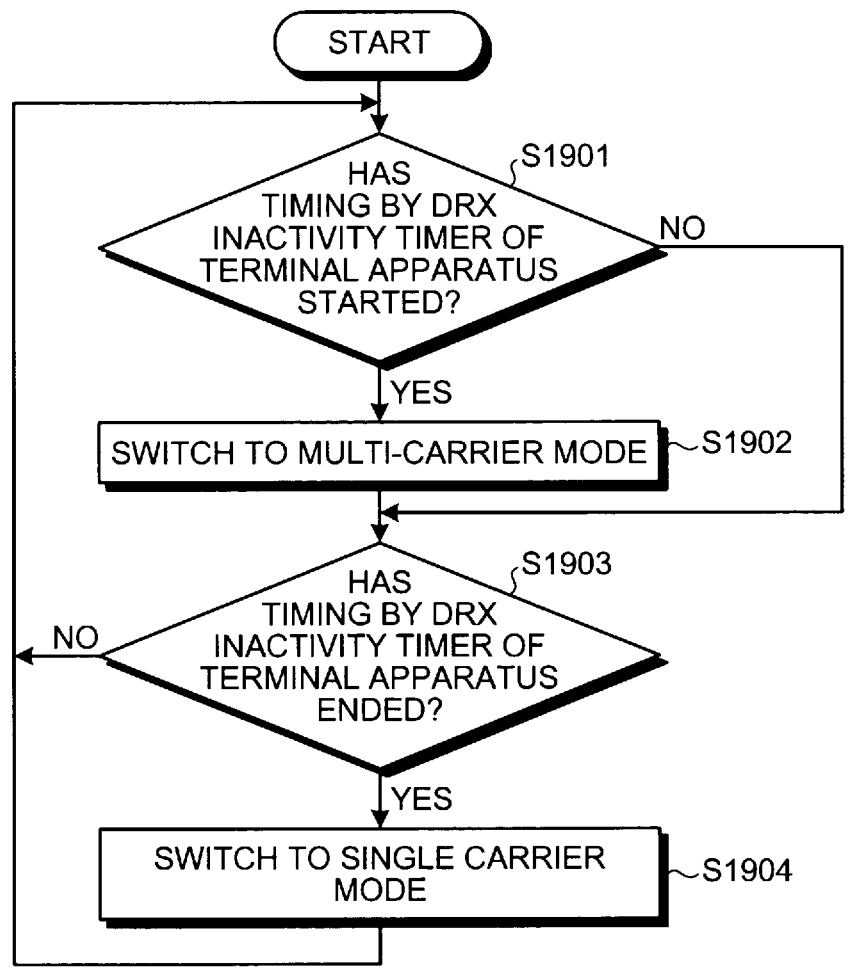
FIG. 19 is a flowchart of an example of operations of the base station apparatus according to the fifth embodiment.

FIG. 19 is a flowchart of an example of operations of the base station apparatus according to the fifth embodiment. The base station apparatus 400 according to the fifth embodiment (for example, see FIG. 9), for example, performs the following operations. As depicted in FIG. 19, the carrier count switch 410 determines whether timing of the DRX inactivity period by the DRX inactivity timer at the terminal apparatus 300 has started (step S1901). If the timing by the DRX inactivity timer has not started (step S1901: NO), the flow proceeds to step S1903.

At step S1901, if the timing by the DRX inactivity timer has started (step S1901: YES), the carrier count switch 410 switches the communication mode of the base station apparatus 400 to the multi-carrier mode (step S1902). Next, the carrier count switch 410 determines whether the timing of the DRX inactivity period by the DRX inactivity timer in the terminal apparatus 300 has ended (step S1903).

At step S1903, if the timing by the DRX inactivity timer has not ended (step S1903: NO), the flow returns to step S1901 and operations therefrom are continued. If the timing by the DRX inactivity timer has ended (step S1903: YES), the carrier count switch 410 switches the communication mode of the base station apparatus 400 to the single carrier mode (step S1904); and the flow returns to step S1901 and operations therefrom are continued.

At step S1901, according to whether an ACK signal that is in response to a DRX setting signal transmitted to the terminal apparatus 300 has been received, the base station apparatus 400, for example, determines whether the timing by the DRX inactivity timer has started. At step S1903, according to whether the given period has elapsed, which starts upon the reception of an ACK signal that is in response to a DRX setting signal, the base station apparatus 400, for example, determines whether the timing by the DRX inactivity timer has ended.

In this manner, the terminal apparatus 300 according to the fifth embodiment acquires timer information that indicates the operation state of the DRX inactivity timer timing the DRX inactivity period, and based on the acquired timer information, the terminal apparatus 300 switches the communication mode. Consequently, since existing timer information can be used as information indicating a change in the communication state, communication resources can be used efficiently without new control information being communicated to/from the base station apparatus 400.

For example, while the DRX inactivity timer is in operation, the possibility of data being transmitted from the base station apparatus 400 is high and therefore, when timing by the DRX inactivity timer starts, the terminal apparatus 300 switches to the multi-carrier mode, thereby enabling communication of high throughput to be performed. Further, if the DRX inactivity timer is not in operation, the possibility of data being transmitted from the base station apparatus 400 is low and therefore, when the timing by the DRX inactivity timer ends, the terminal apparatus 300 switches to the single carrier mode, thereby enabling power consumption to be suppressed.

Figure 20:
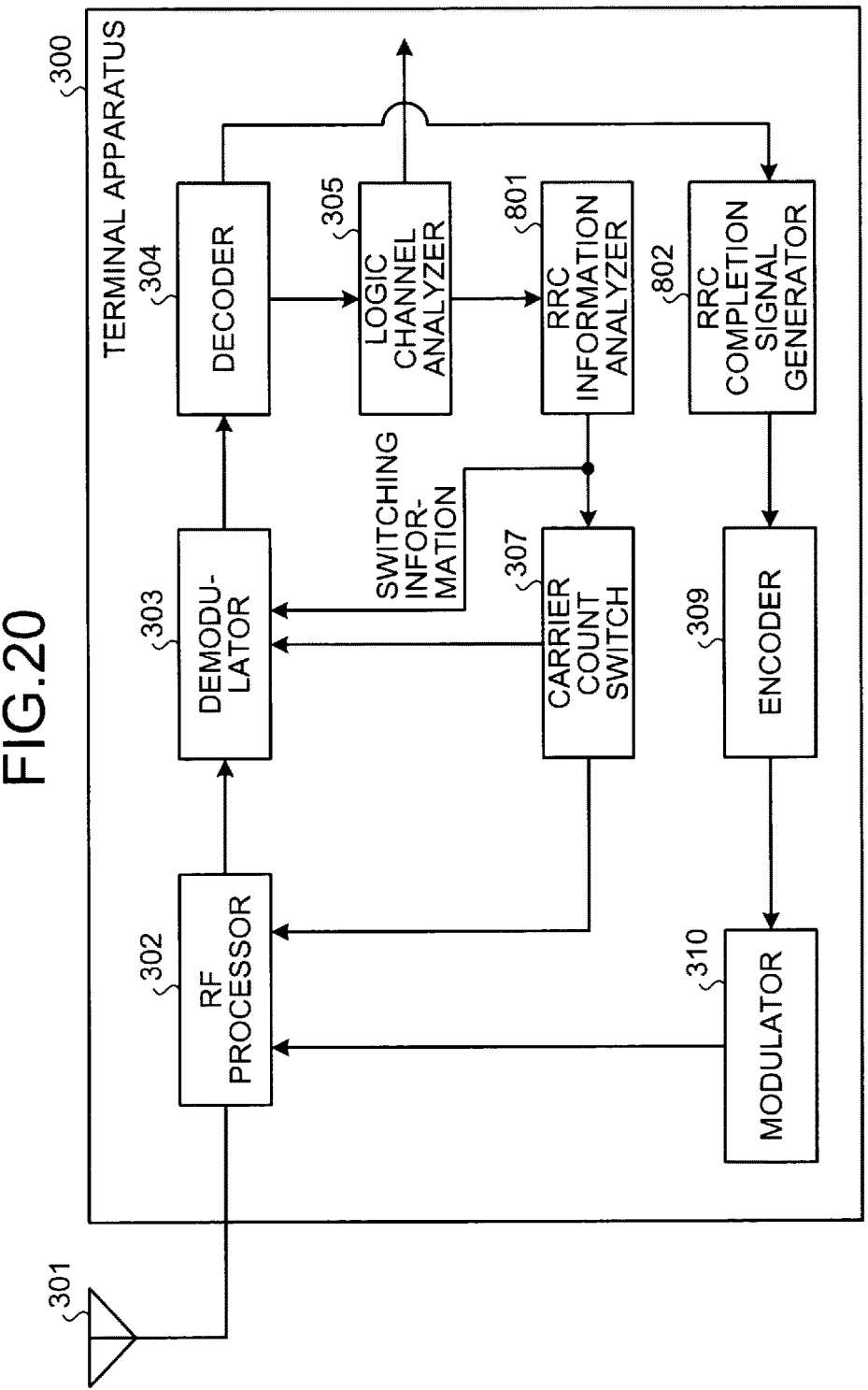
FIG. 20 is a block diagram of a configuration of the terminal apparatus according to a sixth embodiment.

FIG. 20 is a block diagram of a configuration of the terminal apparatus according to a sixth embodiment. In FIG. 20, components identical to those depicted in FIG. 8 are given the same reference numerals used in FIG. 8 and description thereof is omitted. The RRC information analyzer 801 detects from the RRC message output from the logic channel analyzer 305, switching information concerning a connected mode and an idle mode.

The connected mode is, for example, a connected mode prescribed under LTE. The idle mode is, for example, an idle mode prescribed under LTE. The RRC information analyzer 801 outputs the detected switching information to the demodulator 303 and the carrier count switch 307. The demodulator 303 switches between the connected mode and the idle mode, based on the switching information output from the RRC information analyzer 801.

The carrier count switch 307 switches the communication mode, based on the switching information output from the RRC information analyzer 801. For example, when the terminal apparatus 300 is in the connected mode, the carrier count switch 307 switches the communication mode to the multi-carrier mode. Further, when the terminal apparatus 300 is in the idle mode, the carrier count switch 307 switches the communication mode to the multi-carrier mode.

Figure 21:
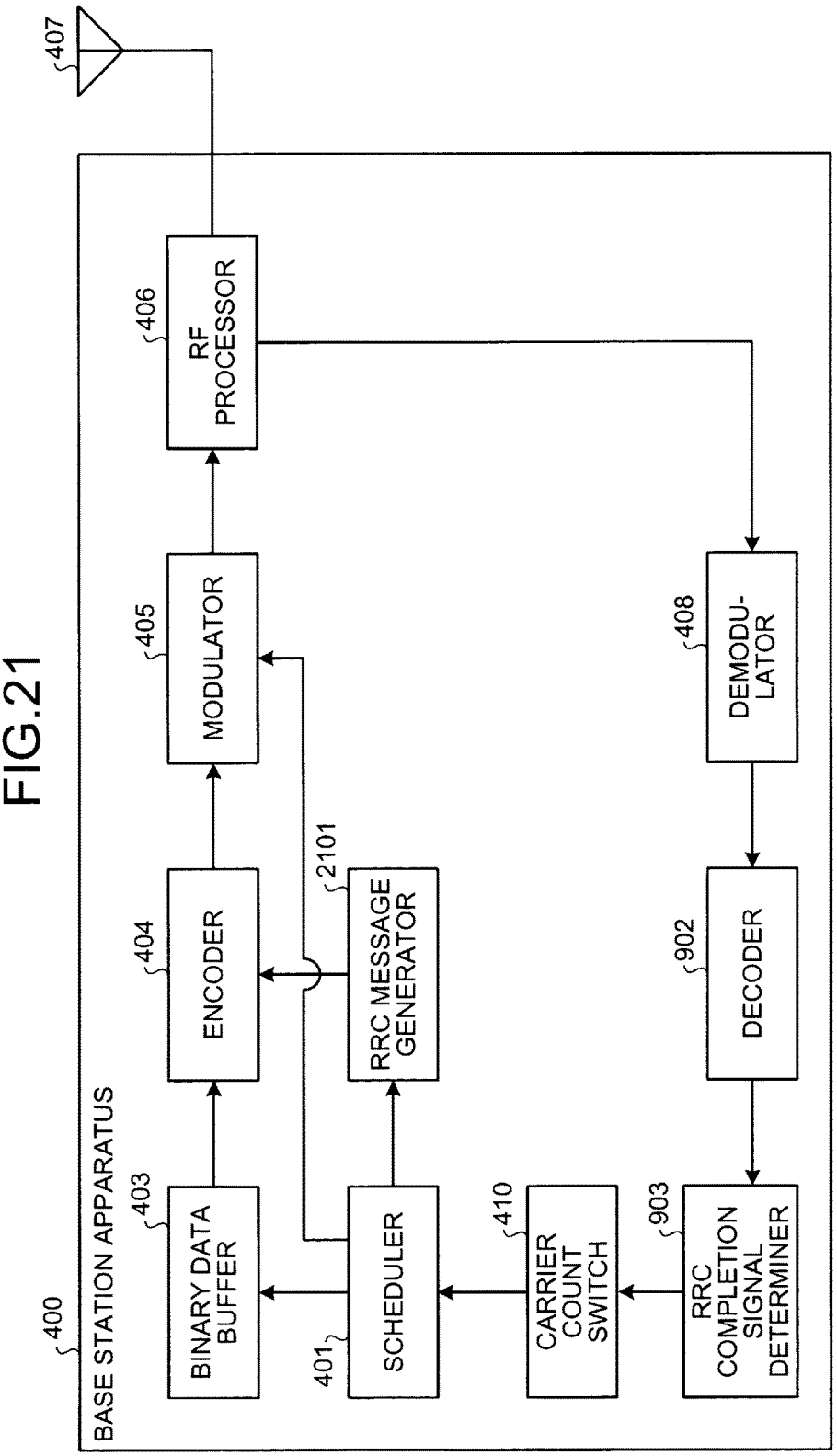
FIG. 21 is a block diagram of a configuration of the base station apparatus according to the sixth embodiment.

FIG. 21 is a block diagram of a configuration of the base station apparatus according to the sixth embodiment. In FIG. 21, components identical to those depicted in FIG. 9 are given the same reference numerals used in FIG. 9 and description thereof is omitted. As depicted in FIG. 21, the base station apparatus 400 according to the sixth embodiment includes an RRC message generator 2101 in place of the DRX cycle setting controller 901 in the configuration depicted in FIG. 9.

In performing scheduling, the scheduler 401 determines whether to switch between the connected mode and the idle mode of the terminal apparatus 300. The scheduler 401 notifies the RRC message generator 2101 and the modulator 405 of the scheduling results. The RRC message generator 2101 generates switching information indicating switching to the connected mode or to the idle mode, based on scheduling results from the scheduler 401.

The RRC message generator 2101 outputs to the encoder 404, an RRC message that includes the generated switching information. The encoder 404 stores the RRC message output from the RRC message generator 2101 to data output from the binary data buffer 403. The encoder 404 encodes the data to which the RRC has been stored, and outputs the encoded data to the modulator 405.

The RF processor 406 converts the frequency of the RRC completion signal output from the antenna 407, from a high frequency wave to a baseband, and outputs the frequency converted RRC completion signal to the demodulator 408. The demodulator 408 demodulates the RRC completion signal output from the RF processor 406 and outputs the demodulated RRC completion signal to the decoder 902.

The decoder 902 decodes the RRC completion signal output from the demodulator 408. The decoder 902 outputs the decoded RRC completion signal to the RRC completion signal determiner 903. The RRC completion signal determiner 903 makes a determination concerning the RRC completion signal output from the decoder 902. For example, the RRC completion signal determiner 903 determines whether RRC completion signal is an RRC completion signal that is in response to switching information requesting switching to the connected mode, or an RRC completion signal that is in response to switching information requesting switching to the idle mode. The RRC completion signal determiner 903 notifies the carrier count switch 410 of the determination results.

The carrier count switch 410 switches the communication mode of the base station apparatus 400, based on the determination results from the RRC completion signal determiner 903. For example, when the RRC completion signal determiner 903 reports that an RRC completion signal has been acquired in response to switching information requesting switching to the connected mode, the carrier count switch 410 switches the communication mode to the multi-carrier mode. When the RRC completion signal determiner 903 reports that an RRC completion signal has been acquired in response to switching information requesting switching to the idle mode, the carrier count switch 410 switches the communication mode to the single carrier mode.

Figure 22:
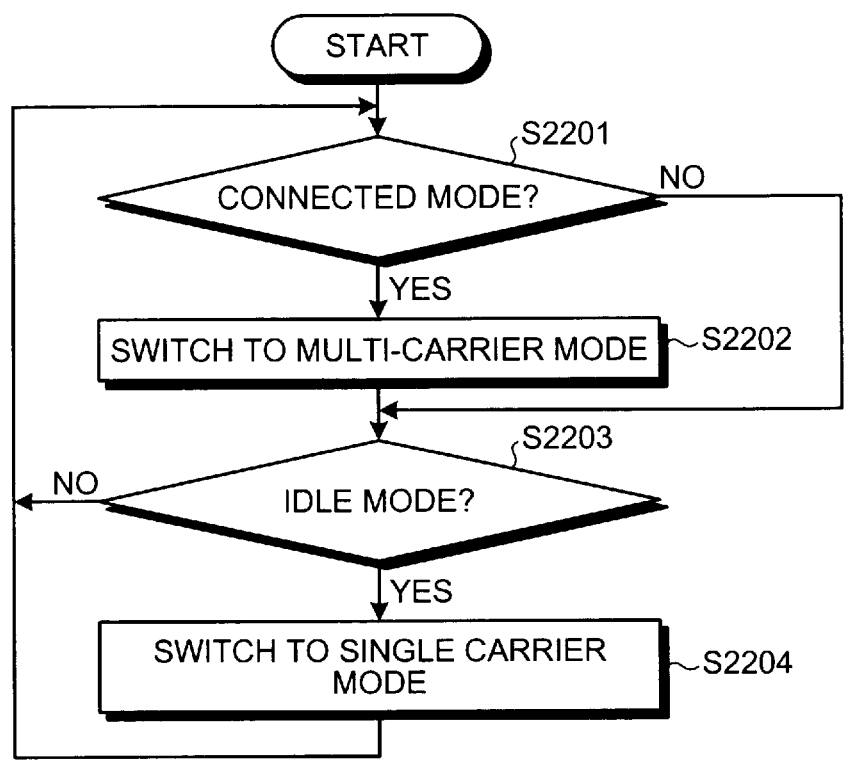
FIG. 22 is a flowchart of an example of operations of the terminal apparatus according to the sixth embodiment.

FIG. 22 is a flowchart of an example of operations of the terminal apparatus according to the sixth embodiment. The terminal apparatus 300 (see FIG. 20), for example, performs the following operations. As depicted in FIG. 22, the carrier count switch 307 determines whether the terminal apparatus 300 is in the connected mode (step S2201). If the terminal apparatus 300 is not in the connected mode (step S2201: NO), the flow proceeds to step S2203.

At step S2201, if the terminal apparatus 300 is in the connected mode (step S2201: YES), the carrier count switch 307 switches the communication mode of the terminal apparatus 300 to the multi-carrier mode (step S2202). Next, the carrier count switch 307 determines whether the terminal apparatus 300 is in the idle mode (step S2203).

At step S2203, if the terminal apparatus 300 is not in the idle mode (step S2203: NO), the flow returns to step S2201 and operations therefrom are continued. If the terminal apparatus 300 is in the idle mode (step S2203: YES), the carrier count switch 307 switches the communication mode of the terminal apparatus 300 to the single carrier mode (step S2204); and the flow returns to step S2201 and the operations therefrom are continued. By performing the operations above, the terminal apparatus 300 can switch the communication mode, based on switching information.

Figure 23:
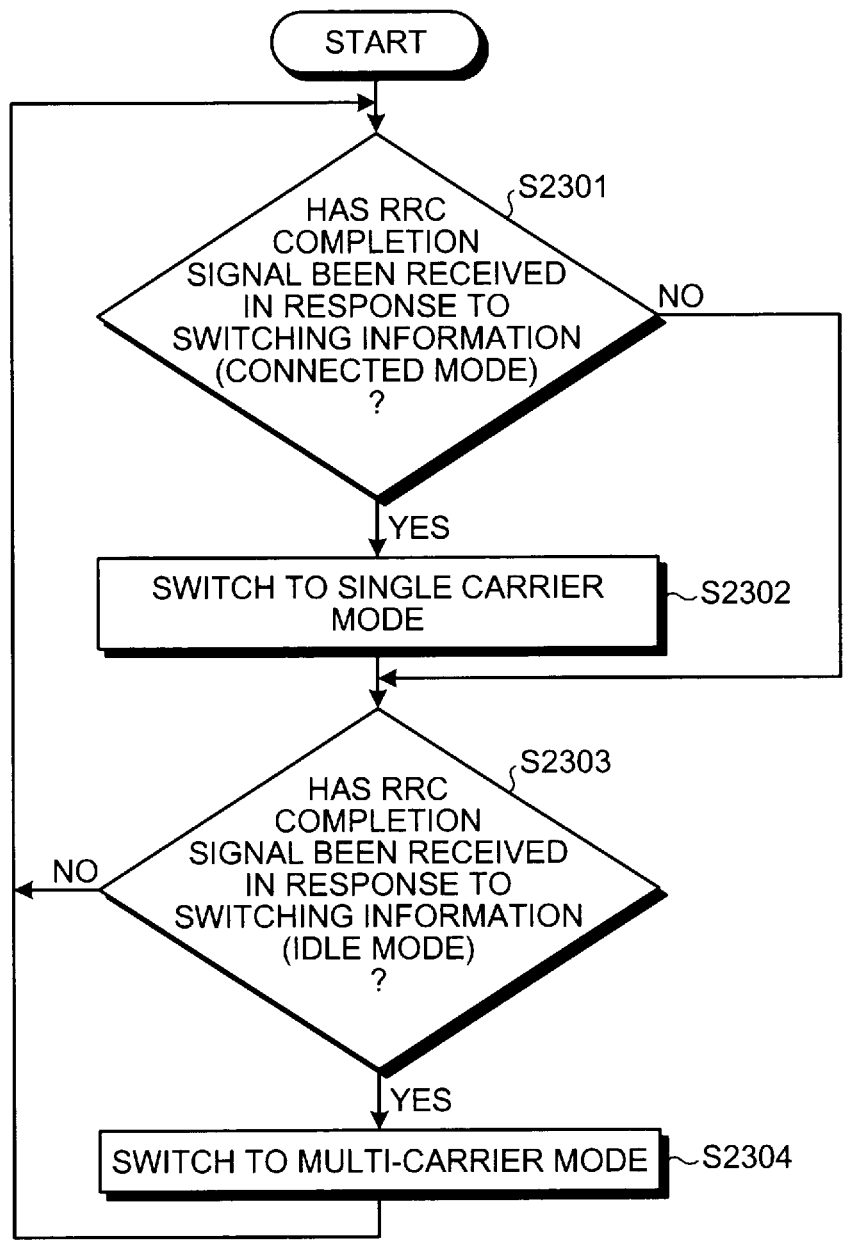
FIG. 23 is a flowchart of an example of operations of the base station apparatus according to the sixth embodiment.

FIG. 23 is a flowchart of an example of operations of the base station apparatus according to the sixth embodiment. The base station apparatus 400 (see FIG. 21), for example, performs the following operations. As depicted in FIG. 23, the RRC completion signal determiner 903 determines whether an RRC completion signal has been received from the terminal apparatus 300 in response to switching information that was transmitted to the terminal apparatus 300 and requested switching to the connected mode (step S2301).

At step S2301, if an RRC completion signal in response to the switching information has not been received (step S2301: NO), the flow proceeds to step S2303. If an RRC completion signal in response to the switching information has been received (step S2301: YES), the scheduler 401 switches the communication mode of the base station apparatus 400 to the single carrier mode (step S2302).

Next, the RRC completion signal determiner 903 determines whether an RRC completion signal has been received from the terminal apparatus 300 in response to switching information that was transmitted to the terminal apparatus 300 and requested switching to the idle mode (step S2303). If an RRC completion signal in response to the switching information has not been received (step S2303: NO), the flow returns to step S2301 and operations therefrom are continued.

At step S2303, if an RRC completion signal in response to the switching information has been received (step S2303: YES), the carrier count switch 410 switches the communication mode to the multi-carrier mode (step S2304); and the flow returns to step S2301 and operations therefrom are continued. By performing the operations above, the base station apparatus 400 can switch the communication mode, based on an RRC completion signal that has been transmitted by the terminal apparatus 300, based on the switching information.

In this manner, the terminal apparatus 300 according to the sixth embodiment acquires switching information indicating switching to the connected mode or the idle mode of the terminal apparatus 300 and based on the acquired switching information, switches the communication mode. Consequently, since existing switching information can be used as information indicating a change in the communication state, communication resources can be used efficiently without new control information being communicated to/from the base station apparatus 400.

For example, when the terminal apparatus 300 is in the connected mode, the possibility of data being transmitted from the base station apparatus 400 is higher and therefore, during the connected mode, the terminal apparatus 300 switches to the multi-carrier mode, thereby enabling communication of high throughput to be performed. Further, when the terminal apparatus 300 is in the idle mode, the possibility of data being transmitted from the base station apparatus 400 is low and therefore, during the idle mode, the terminal apparatus 300 switches to the single carrier mode, thereby enabling power consumption to be suppressed.

The base station apparatus 400 according to the sixth embodiment acquires an RRC completion signal that is from the terminal apparatus 300 and in response to switching information transmitted to the terminal apparatus 300; and based on the acquired RRC completion signal, the base station apparatus 400 switches the communication mode. Consequently, since existing an RRC completion signal can be used as information indicating a change in the communication state, communication resources can be used efficiently without new control information being communicated to/from the terminal apparatus 300.

For example, upon reception of an RRC completion signal that is from the terminal apparatus 300 and in response to switching information that was transmitted to the terminal apparatus and requested switching to the connected mode, the base station apparatus 400 switches to the multi-carrier mode. Further, upon reception of an RRC completion signal that is from the terminal apparatus 300 and in response to switching information that was transmitted to the terminal apparatus 300 and requested switching to the idle mode, the base station apparatus 400 switches to the single carrier mode.

Consequently, since the communication is switched after confirmation of the switching information being properly received by the terminal apparatus 300, the communication mode of the base station apparatus 400 can be switched in conjunction with the switching of communication modes by the terminal apparatus 300.

Figure 24:
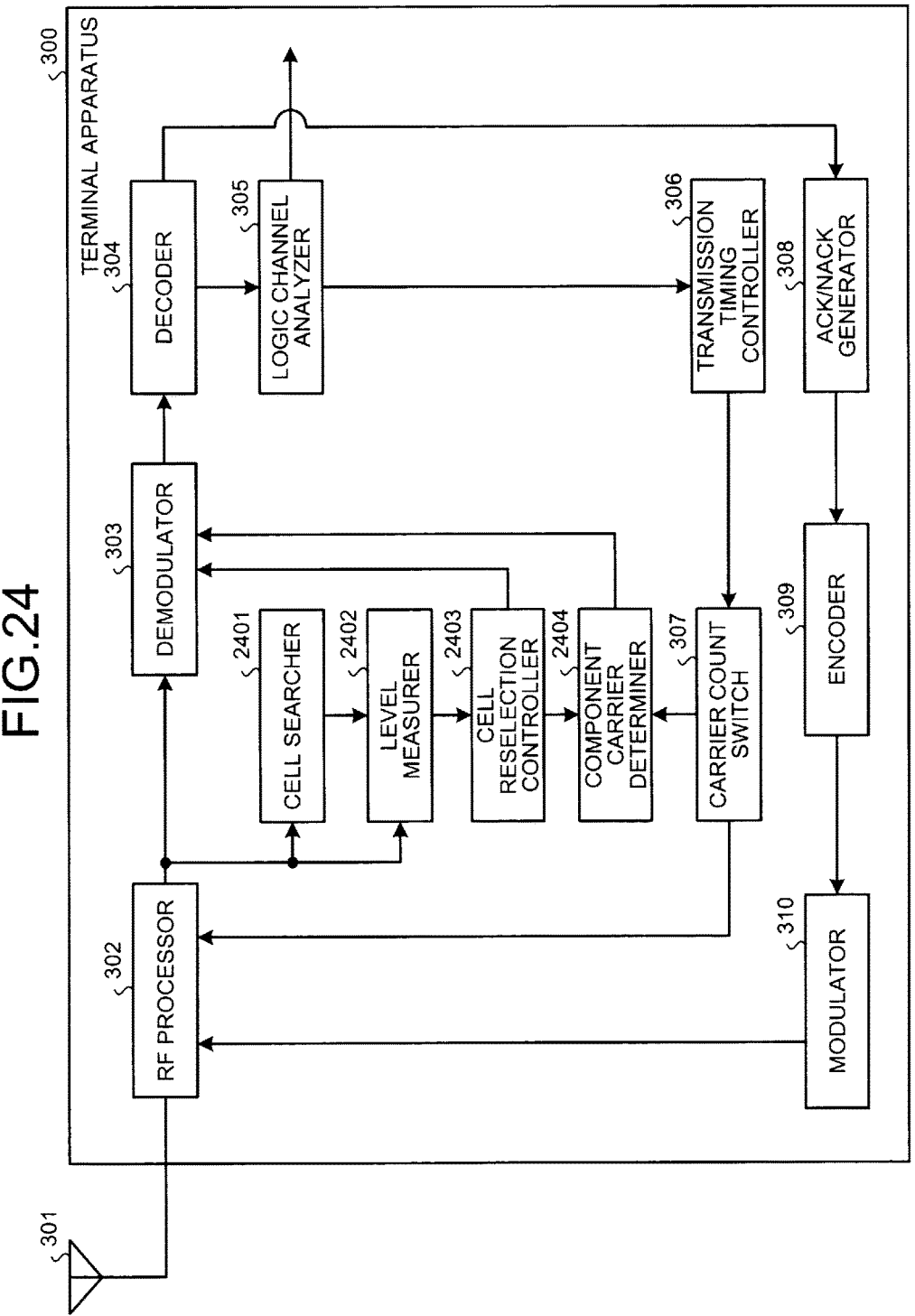
FIG. 24 is a block diagram of a configuration of the terminal apparatus according to a seventh embodiment.

FIG. 24 is a block diagram of a configuration of the terminal apparatus according to a seventh embodiment. In FIG. 24, components identical to those depicted in FIG. 3 are given the same reference numerals used in FIG. 3 and description thereof is omitted. The terminal apparatus 300 according to the seventh embodiment includes a cell searcher 2401, a level measurer 2402, a cell reselection controller 2403, and a component carrier determiner 2404 in addition to the configuration depicted in FIG. 3.

The antenna 301 receives synchronization channels (SCH) transmitted from base station apparatuses, including the base station apparatus 400. The antenna 301 outputs the received SCHs to the RF processor 302. The RF processor 302 converts the frequency of each of the SCHs output from the antenna 301, from a high frequency wave to a baseband and outputs the frequency converted SCHs to the demodulator 303, the cell searcher 2401 and the level measurer 2402.

The cell searcher 2401, based on the SCHs output from the RF processor 302, performs a cell search of detecting base station apparatuses in the vicinity of the terminal apparatus 300. The cell searcher 2401 notifies the level measurer 2402 of base station apparatuses detected by the cell search. The level measurer 2402, for each base station apparatus reported by the cell searcher 2401, measures the level of the corresponding SCH output from the RF processor 302. The level measurer 2402 notifies the cell reselection controller 2403 of the measured SCH level for each base station apparatus.

The cell reselection controller 2403 performs cell reselection, based on the SCH level for each base station apparatus reported by the level measurer 2402. The cell reselection controller 2403, for example, performs cell reselection prescribed under LTE. For example, the cell reselection controller 2403 compares the SCH level of the current base station apparatus of the terminal apparatus 300 and the SCH level of another base station apparatus.

If the SCH level of the current base station apparatus is lower than that of the other base station apparatus, the cell reselection controller 2403 performs cell reselection to select the other base station apparatus. In this case, the cell reselection controller 2403 controls the demodulator 303 to demodulate the signal from the other base station apparatus and notifies the component carrier determiner 2404 of the reselection results.

The component carrier determiner 2404, based on the reselection results from the cell reselection controller 2403, determines the component carrier to be used for reception by the terminal apparatus 300. The component carrier determiner 2404 further determines the component carrier to be used for reception by the terminal apparatus 300, according to the communication mode switched to by the carrier count switch 307. The component carrier determiner 2404 controls the demodulator 303 to demodulate the determined component carrier.

Here, the component carrier determiner 2404 determines, as the component carrier after cell reselection, a component carrier of the same frequency as that used before cell reselection. Consequently, the component carrier used after cell reselection can be determined by a simple process.

Here, a case is described where after cell reselection, the communication mode of the terminal apparatus 300 is the single carrier mode. In this case, the component carrier determiner 2404, as the component carrier to be used, determines a component carrier of the same frequency as that used before cell reselection. Consequently, the component carrier to be used during the single carrier mode can be determined by a simple process.

The terminal apparatus 300 according to the seventh embodiment includes a cell searcher 2401, a level measurer 2402, a cell reselection controller 2403, and a component carrier determiner 2404 in addition to the configuration depicted in the second embodiment (see FIG. 3). Similarly, a cell searcher 2401, a level measurer 2402, a cell reselection controller 2403, and a component carrier determiner 2404 can be added to the configuration of the terminal apparatus 300 according to any one among the third to sixth embodiments, as the seventh embodiment.

Figure 25:
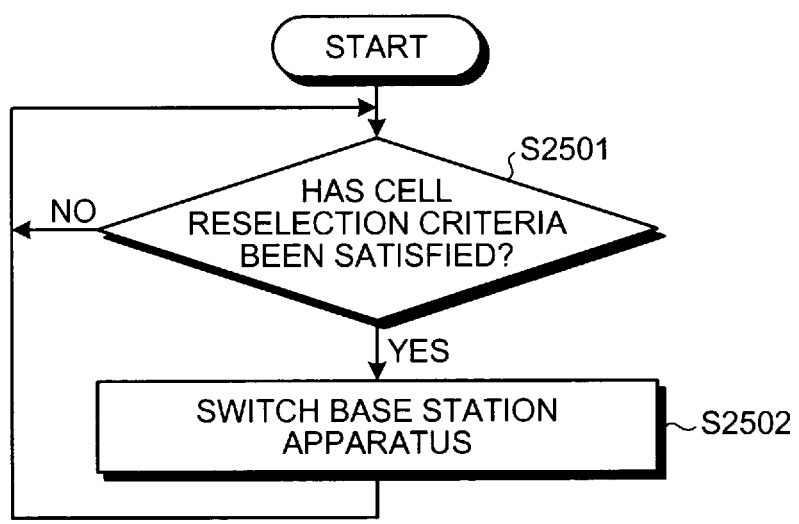
FIG. 25 is a flowchart of an example of operations of the terminal apparatus according to the seventh embodiment.

FIG. 25 is a flowchart of an example of operations of the terminal apparatus according to the seventh embodiment. The terminal apparatus 300 (see FIG. 24), for example, performs the following operations. As depicted in FIG. 25, the cell reselection controller 2403 determines whether cell selection criteria for performing cell reselection have been satisfied (step S2501), and waits until the cell selection criteria are satisfied (step S2501: NO).

At step S2501, when the cell reselection criteria are satisfied (step S2501: YES), the cell reselection controller 2403 performs switching to another base station apparatus (step S2502), ending a series of the operations. At step S2501, the cell reselection controller 2403, for example, compares the SCH level of the current base station apparatus of the terminal apparatus 300 and the SCH level of another base station apparatus.

When the SCH level of the current base station apparatus of the terminal apparatus 300 becomes lower than the SCH level of another base station apparatus, the cell reselection controller 2403 determines that cell reselection criteria have been satisfied. By performing the operations above, the terminal apparatus 300 can perform cell reselection when cell reselection criteria are satisfied.

Figure 26:
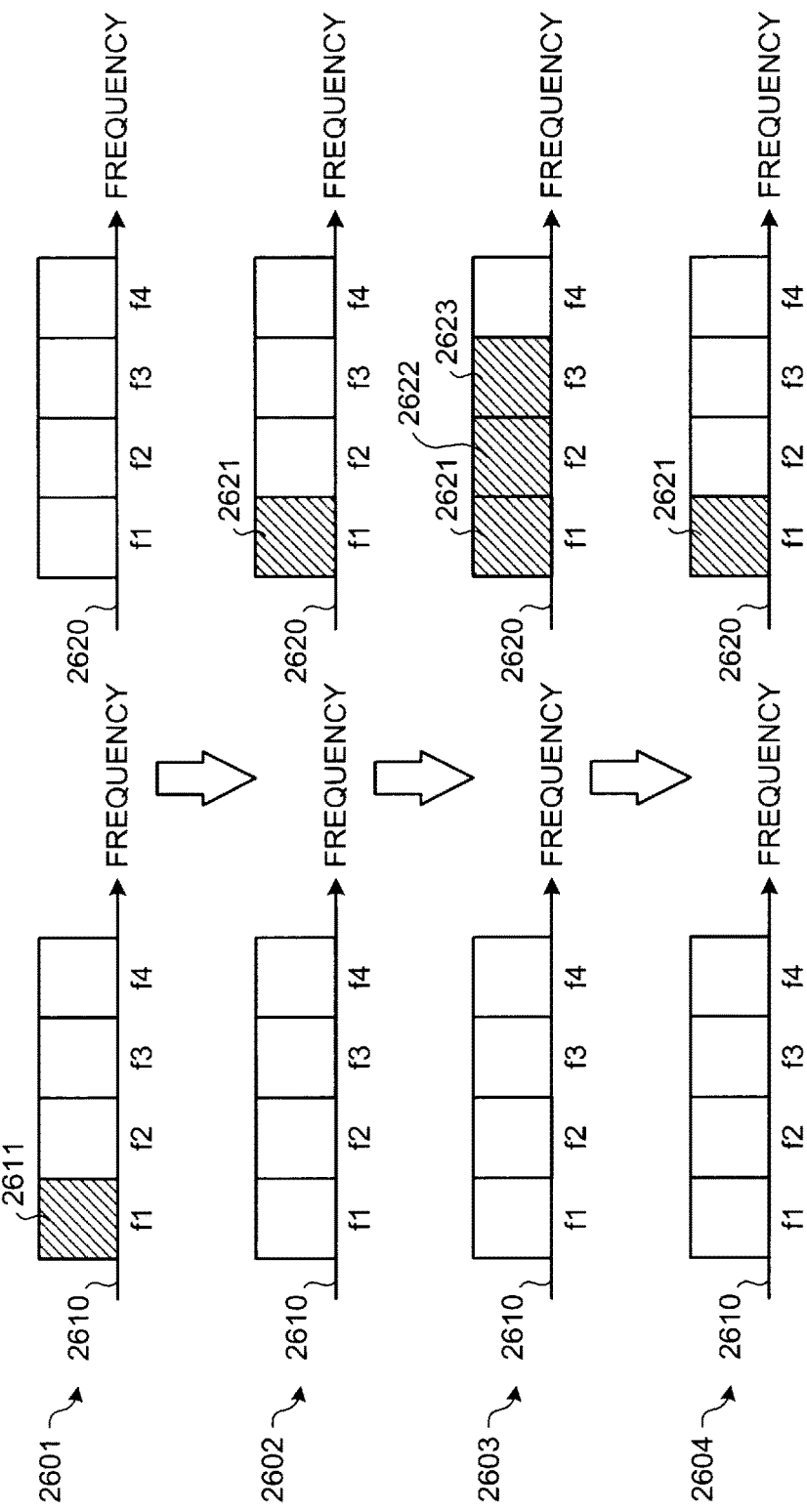
FIG. 26 is a diagram of operations of the terminal apparatus according to the seventh embodiment.

FIG. 26 is a diagram of operations of the terminal apparatus according to the seventh embodiment. In FIG. 26, the communication resource 2610 represents a communication resource used in communication between a base station apparatus and the terminal apparatus 300 before cell reselection. A communication resource 2620 represents a communication resource used in communication between a base station apparatus and the terminal apparatus 300 after cell reselection. The horizontal axis represents frequency for the communication resource 2610 and the communication resource 2620.

As indicated by reference numeral 2601, it is assumed that before cell reselection, the terminal apparatus 300 communicated with a base station apparatus by a component carrier 2611 that corresponds to frequency f1 of the communication resource 2610. When the terminal apparatus 300 performs cell reselection, as indicated by reference numeral 2602, the terminal apparatus 300 communicates with the base station apparatus by a component carrier 2621 corresponding to the same frequency f1 as the frequency f1 used before cell reselection.

When the communication mode of the terminal apparatus 300 switches to the multi-carrier mode, as indicated by reference numeral 2603, the terminal apparatus 300 uses component carriers (component carriers 2621-2623) including the component carrier 2621 and communicates with the base station apparatus. When the communication mode of the terminal apparatus 300 switches from the multi-carrier mode to the single carrier mode, as indicated by reference numeral 2604, the terminal apparatus 300 uses the component carrier 2621 to communicate with the base station apparatus.

In this manner, the terminal apparatus 300 depicted in FIG. 24 determines, as the component carrier for reception during the single carrier mode, a component carrier that is of the same frequency as that of the component carrier received before cell reselection. Consequently, component carrier determination after cell reselection and component carrier determination during the single carrier mode can be performed by a simple process.

Figure 27:
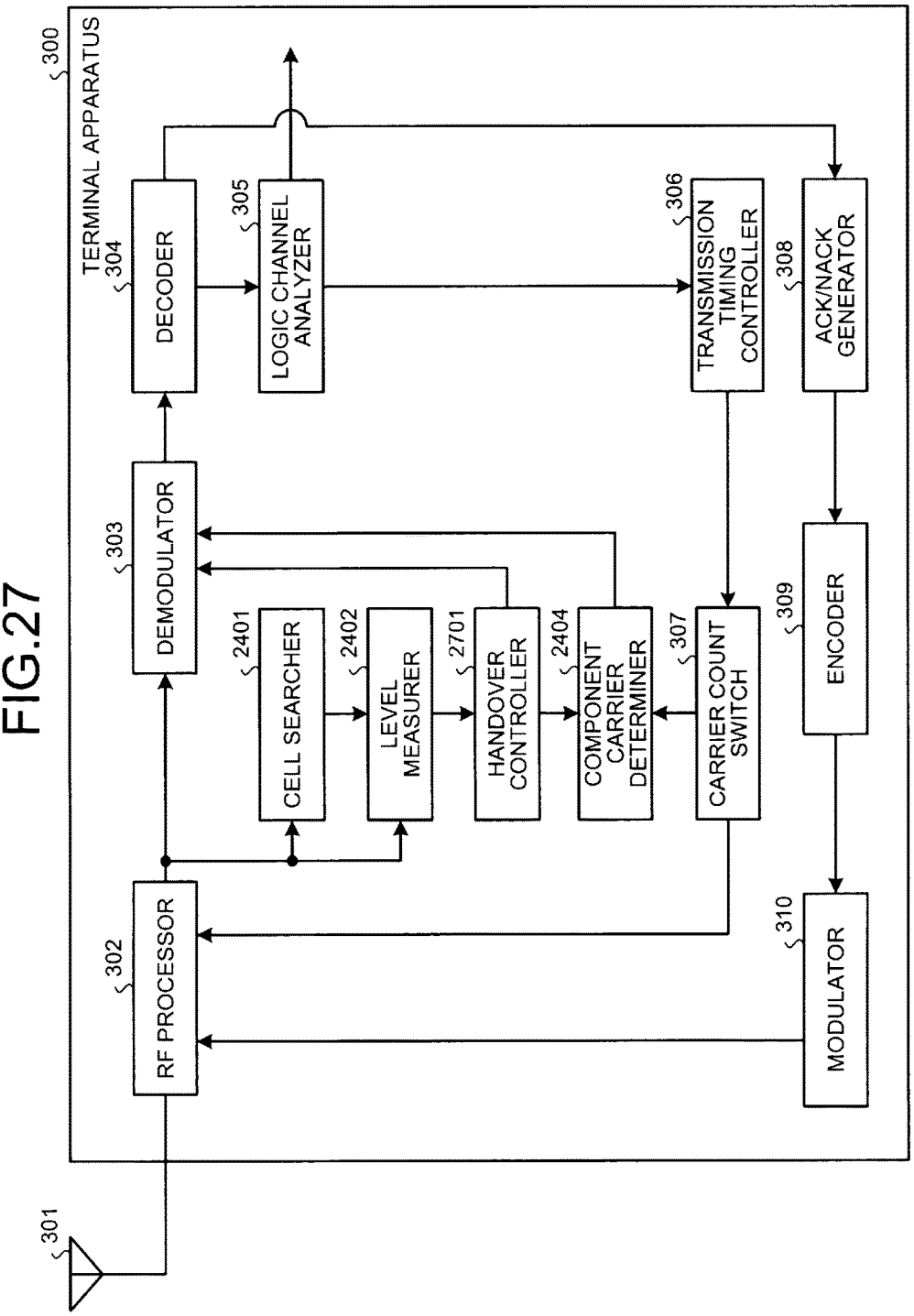
FIG. 27 is a block diagram of a first modification of the terminal apparatus according to the seventh embodiment.

FIG. 27 is a block diagram of a first modification of the terminal apparatus according to the seventh embodiment. In FIG. 27, components identical to those depicted in FIG. 24 are given the same reference numerals used in FIG. 24 and description thereof is omitted. As depicted in FIG. 27, the terminal apparatus 300 according to the seventh embodiment includes a handover controller 2701 in place of the cell reselection controller 2403 depicted in FIG. 24.

The level measurer 2402 notifies the handover controller 2701 of the SCH level of each base station apparatus. The handover controller 2701 performs handover based on the SCH levels reported by the level measurer 240. The handover controller 2701, for example, performs handover prescribed under LTE. For example, the handover controller 2701 compares the SCH level of the base station apparatus with which the terminal apparatus 300 is communicating and the SCH level of another base station apparatus.

When the SCH level of the base station apparatus (e.g., connected mode) with which the terminal apparatus 300 is communicating becomes lower than the SCH level of another base station apparatus, the handover controller 2701 performs handover to the other base station apparatus. In this case, the handover controller 2701 controls the demodulator 303 to demodulate a signal of the other base station apparatus and notifies the component carrier determiner 2404 of the handover determination results.

The component carrier determiner 2404, based on the handover determination results reported by the handover controller 2701, determines the component carrier to be used for reception by the terminal apparatus 300. The component carrier determiner 2404 further determines the component carrier to be used for reception by the terminal apparatus, according to the communication mode switched to by the carrier count switch 307. The component carrier determiner 2404 controls the demodulator 303 to demodulate the determined component carrier.

Here, the component carrier determiner 2404 determines as a component carrier to be used after handover, a component carrier of the same frequency as the frequency used before handover. Consequently, a component carrier to be used after handover can be determined by a simple process.

A case where after handover, the communication mode of the terminal apparatus 300 is switched to the single carrier mode will be described. In this case, the component carrier determiner 2404 determines, as the component carrier to be used, a component carrier of the same frequency used before handover. Consequently, a component carrier to be used during the single carrier mode can be determined by a simple process.

In this manner, the terminal apparatus 300 depicted in FIG. 27 determines, as the component carrier for reception during the single carrier mode after handover, a component carrier of the same frequency as that of the component carrier received before handover. Consequently, a component carrier after handover and a component carrier during the single carrier mode can be determined by a simple process.

Figure 28:
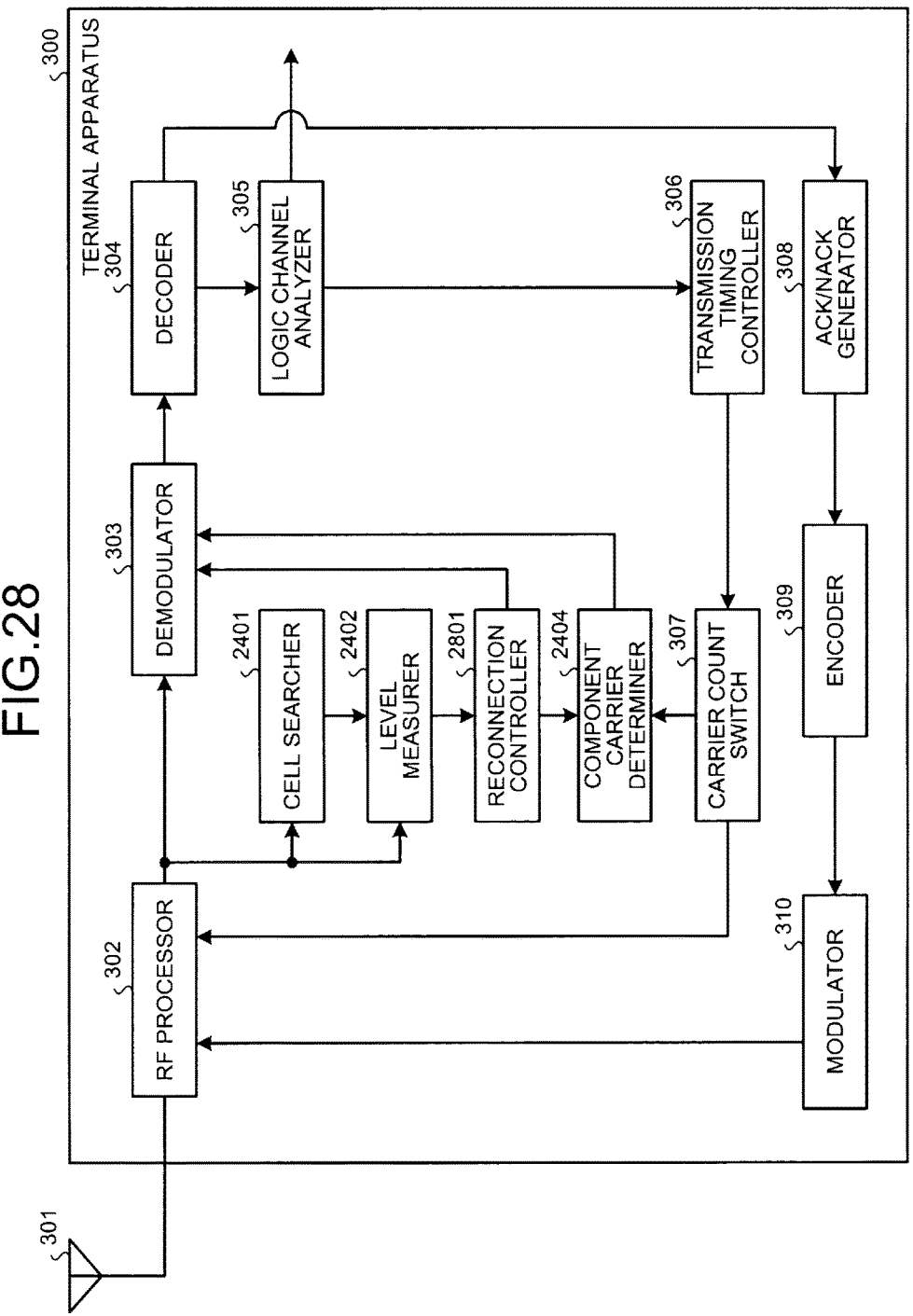
FIG. 28 is a block diagram of a second modification of the terminal apparatus according to the seventh embodiment.

FIG. 28 is a block diagram of a second modification of the terminal apparatus according to the seventh embodiment. In FIG. 27, components identical to those depicted in FIG. 24 are given the same reference numerals used in FIG. 24 and description thereof is omitted. As depicted in FIG. 27, the terminal apparatus 300 according to the seventh embodiment includes a reconnection controller 2801 in place of the cell reselection controller 2403 depicted in FIG. 24.

The level measurer 2402 notifies the reconnection controller 2801 of the measured level for each base station apparatus. Based on the SCH level that is of the base station apparatus with communication is being performed and output from the level measurer 2402, the reconnection controller 2801 performs reconnection to the cell with which communication is being performed. The reconnection controller 2801, for example, performs reconnection prescribed under LTE. For example, the reconnection controller 2801 compares the SCH level of the base station apparatus with which the terminal apparatus 300 is communicating and a given threshold.

When the SCH level of the base station with which the terminal apparatus 300 is communicating becomes lower than the given threshold, the reconnection controller 2801 reconnects to the base station apparatus. In this case, the reconnection controller 2801 performs a reconnection process with respect to the demodulator 303 and notifies the component carrier determiner 2404 of the reconnection determination results.

The component carrier determiner 2404, based on the reconnection determination results from the reconnection controller 2801, determines a component carrier to be used for reception by the terminal apparatus 300. The component carrier determiner 2404 determines, as a component carrier to be used after reconnection, a component carrier that is of the same frequency as the frequency used before reconnection. Consequently, a component carrier to be used after reconnection can be determined by a simple process.

Here, a case has been described where at the reconnection controller 2801, the communication mode of the terminal apparatus 300 is the single carrier mode. In this case, the component carrier determiner 2404 determines, as a component carrier to be used, a component carrier that is of the same frequency as the frequency used before the reconnection. Consequently, a component carrier to be used during the single carrier mode can be determined by a simple process.

In this manner, the terminal apparatus 300 depicted in FIG. 28 determines, as a component carrier to be used for reception during the single carrier mode after reconnection, a component carrier that is of the same frequency as that received before reconnection. Consequently, the process of determining a component carrier to be used after reconnection and a component carrier to be used during the single carrier mode can be simplified.

As described, according to the communication apparatus, communication system, communication method, and terminal apparatus, communication resources can be used efficiently. In the second to seventh embodiments, although examples in which the communication resources are component carriers prescribed under LTE-Advanced, the communication resources are not limited to the component carriers and communication resources of divided physical resources are applicable overall.

In each of the embodiments, although each of the communication apparatuses is described to have a multi-carrier mode and a single carrier mode as communication modes, the communication modes of the communication apparatuses is not limited to the multi-carrier mode and the single carrier mode, and may be any communication mode provided the number of communication carriers to be used differ. For example, the communication apparatuses may have in place of the multi-carrier mode, a first communication mode that uses a given number of communication carriers; and in place of the single carrier mode, a second communication mode that uses fewer communication carriers than the given number above.

The disclosed communication apparatus, communication system, communication method, and terminal apparatus, for example, can be applied to an LTE-advanced communication scheme. However, the disclosed communication apparatus, communication system, communication method, and terminal apparatus are not limited to an LTE-advanced scheme and are applicable to communication schemes overall that can divide data among multiple physical resources and transmit the data.

According to the present invention, efficient use of physical resources can be effected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a receiver that can receive data that has been divided among multiple communication carriers and transmitted, and that has multiple communication modes, each using a different number of communication carriers for reception, wherein the receiver has, as the communication modes, a multi-carrier mode in which multiple communication carriers are used and a single carrier mode in which a single communication carrier is used;
an acquirer that acquires information indicating a change in communication volume of the receiver;
a switch that switches the communication mode of the receiver, based on the information acquired by the acquirer, wherein the acquirer acquires a switching information indicating switching to a connected mode prescribed under LTE or to an idle mode prescribed under LTE, of the communication apparatus, and the switch switches the communication mode, based on the switching information acquired by the acquirer, wherein the switch, based on the switching information acquired by the acquirer, switches to the multi-carrier mode when the communication apparatus is in the connected mode prescribed under LTE and switches to the single carrier mode when the communication apparatus is in the idle mode prescribed under LTE;
a controller that performs cell reselection to change a cell with which the receiver communicates; and
a determiner that determines a communication carrier of a frequency identical to that of the communication carrier used by the receiver before the cell reselection to be the communication carrier to be used by the receiver in the single carrier mode after the cell reselection by the controller.

2. The communication apparatus according to claim 1, wherein
the acquirer acquires, as the information indicating a change in the communication volume of the receiver, given information included in a Radio Resource Control (RRC) message, and
the switch switches from the multi-carrier mode to the single carrier mode, based on the given information included in the RRC message acquired by the acquirer.

3. The communication apparatus according to claim 1, further comprising:
a controller that performs handover to change cells during communication by the receiver; and
a determiner that determines a communication carrier of a frequency identical to that of the communication carrier used by the receiver before the handover by the controller, to be the communication carrier to be used by the receiver, in the single carrier mode after the handover by the controller.

4. The communication apparatus according to claim 1, further comprising:
a controller that performs reconnection to a cell with which the receiver communicates; and
a determiner that determines a communication carrier of a frequency identical to that of the communication carrier used by the receiver before the reconnection by the controller, to be the communication carrier to be used by the receiver, in the single carrier mode after the reconnection by the controller.

5. A communication apparatus comprising:
a transmitter that can transmit data divided among multiple communication carriers, and that has multiple communication modes, each using a different number of communication carriers for transmission, wherein the transmitter has, as the communication modes, a multi-carrier mode in which multiple communication carriers are used and a single carrier mode in which a single communication carrier is used;
an acquirer that acquires information indicating a change in communication volume of the transmitter;
a switch that switches the communication mode of the transmitter, based on the information acquired by the acquirer, wherein the acquirer acquires a switching information indicating switching to a connected mode prescribed under LTE or to an idle mode prescribed under LTE of the communication apparatus, and the switch switches the communication mode, based on the switching information acquired by the acquirer, wherein the switch, based on the switching information acquired by the acquirer, switches to the multi-carrier mode when the communication apparatus is in the connected mode prescribed under LTE and switches to the single carrier mode when the communication apparatus is in the idle mode prescribed under LTE;
a controller that performs cell reselection to change a cell with which the transmitter communicates; and a determiner that determines a communication carrier of a frequency identical to that of the communication carrier used by the transmitter before the cell reselection to be the communication carrier to be used by the transmitter in the single carrier mode after the cell reselection by the controller.

6. A communication system comprising:
a first communication apparatus that can transmit, via a transmitter, data divided among multiple communication carriers, that has multiple communication modes that each use a different number of communication carriers for transmission, wherein the first communication apparatus has, as the communication modes, a multi-carrier mode in which multiple communication carriers are used and a single carrier mode in which a single communication carrier is used, and that switches the communication mode according to communication volume, wherein the first communication apparatus includes,
- a first acquirer that acquires information indicating a change in the communication volume of the transmitter,
- a first switch, that switches the communication mode according to the communication volume, wherein the first acquirer acquires a switching information indicating switching to a connected mode prescribed under LTE or to an idle mode prescribed under LTE, and the first switch switches the communication mode, based on the switching information acquired by the first acquirer, wherein the first switch, based on the switching information acquired by the first acquirer, switches to the multi-carrier mode when the first communication apparatus is in the connected mode prescribed under LTE and switches to the single carrier mode when the first communication apparatus is in the idle mode prescribed under LTE; and a second communication apparatus that can receive, via a receiver, the data divided among multiple communication carriers and transmitted by the first communication apparatus, that has the multiple communication modes that each use the different number of communication carriers for reception, wherein the second communication apparatus has, as the communication modes, the multi-carrier mode in which multiple communication carriers are used and the single carrier mode in which the single communication carrier is used, wherein the second communication apparatus includes,
- a second acquirer that acquires information indicating a change in the communication volume of the receiver, and
  - a second switch that switches the communication mode according to communication volume, wherein the acquirer acquires the switching information indicating switching to the connected mode or to the idle mode prescribed under LTE, and the second switch switches the communication mode, based on the switching information acquired by the second acquirer, and wherein the second switch, based on the switching information acquired by the second acquirer, switches to the multi-carrier mode when the second communication apparatus is in the connected mode prescribed under LTE and switches to the single carrier mode when the second communication apparatus is in the idle mode prescribed under LTE, a controller that performs cell reselection to change a cell with which the receiver communicates; and
a determiner that determines a communication carrier of a frequency identical to that of the communication carrier used by the receiver before the cell reselection to be the communication carrier to be used by the receiver in the single carrier mode after the cell reselection by the controller.

7. A communication method comprising:
first communicating that includes
transmitting data divided among multiple communication carriers, wherein the first communicating has, as communication modes, a multi-carrier mode in which multiple communication carriers are used and a single carrier mode in which a single communication carrier is used,
acquiring information indicating a change in communication volume received, and
switching between multiple communication modes that each use a different number of communication carriers for transmission, the switching being according to the communication volume, acquiring a switching information indicating switching to a connected mode prescribed under LTE or to an idle mode prescribed under LTE, and switching the communication mode, based on the switching information acquired, wherein the switching, based on the switching information acquired, switches to the multi-carrier mode when the first communicating is in the connected mode prescribed under LTE and switches to the single carrier mode when the first communicating is in the idle mode prescribed under LTE; and
second communicating that includes
receiving the data divided among multiple communication carriers and transmitted at the first communicating, wherein the second communicating has, as communication modes, the multi-carrier mode in which multiple communication carriers are used and the single carrier mode in which the single communication carrier is used,
acquiring information indicating a change in the communication volume received,
switching between communication modes that each use the different number of communication carriers for reception, the switching being according to the communication volume, acquiring the switching information indicating switching to the connected mode prescribed under LTE or to the idle mode prescribed under LTE, and switching the communication mode, based on the switching information acquired, wherein the switching, based on the switching information acquired, switches to the multi-carrier mode when the second communicating is in the connected mode prescribed under LTE and switches to the single carrier mode when the second communicating is in the idle mode prescribed under LTE,
performing cell reselection to change a cell with which the receiver communicates; and
determining a communication carrier of a frequency identical to that of the communication carrier used by the receiver before the cell reselection to be the communication carrier to be used by the receiver, in the single carrier mode after the cell reselection.

* * * * *